(12) United States Patent
Bollard

(10) Patent No.: US 12,156,105 B2
(45) Date of Patent: *Nov. 26, 2024

(54) ULTRA-WIDEBAND LOCATION SYSTEMS AND METHODS

(71) Applicant: Be Spoon, Le Bourget du Lac (FR)

(72) Inventor: Philippe Bollard, Drumettaz Clarafond (FR)

(73) Assignee: BE SPOON, Le Bourget du Lac (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,492

(22) Filed: Jul. 10, 2023

(65) Prior Publication Data

US 2023/0353991 A1    Nov. 2, 2023

Related U.S. Application Data

(63) Continuation of application No. 17/604,944, filed as application No. PCT/EP2020/060911 on Apr. 17, 2020, now Pat. No. 11,743,696.

(30) Foreign Application Priority Data

Apr. 19, 2019 (WO) .................. PCT/IB2019/000745

(51) Int. Cl.
*H04W 4/33* (2018.01)
*G01S 1/04* (2006.01)
(Continued)

(52) U.S. Cl.
CPC ............. *H04W 4/33* (2018.02); *G01S 1/0428* (2019.08); *G01S 1/24* (2013.01); *G01S 5/021* (2013.01);
(Continued)

(58) Field of Classification Search
CPC ....... H04W 4/33; H04W 4/023; H04W 4/025; H04W 56/001; G01S 1/0428; G01S 1/24;
(Continued)

(56) References Cited

U.S. PATENT DOCUMENTS 7,479,884 B1   1/2009  Fullerton
7,492,316 B1   2/2009  Ameti et al.
(Continued)

FOREIGN PATENT DOCUMENTS

CN   1473310 A     2/2004
CN   101335587 A   12/2008
(Continued)

OTHER PUBLICATIONS

"ZigBee Wireless Sensor Network and its Applications in Internet of Things," downloaded on Jun. 6, 2024, 17 pages (foreign document).
(Continued)

*Primary Examiner* — Dac V Ha
(74) *Attorney, Agent, or Firm* — Slater Matsil, LLP

(57) ABSTRACT

A method includes sending, by a master beacon device and one or more beacon repeater devices, ultra-wideband (UWB) beacon frames. The UWB beacon frames are transmitted as interleaved pairs of UWB beacon frames. Each interleaved pair includes a first UWB beacon frame and a second UWB beacon frame. For each interleaved pair, the first UWB beacon frame and the second UWB beacon frame are transmitted with a master time delay. The method further includes receiving, by one or more tag devices, at least one of the interleaved pairs of UWB beacon frames.

20 Claims, 12 Drawing Sheets

(51) Int. Cl.
  *G01S 1/24* (2006.01)
  *G01S 5/02* (2010.01)
  *G01S 13/02* (2006.01)
  *H04B 1/7163* (2011.01)
  *H04B 1/7183* (2011.01)
  *H04B 7/15* (2006.01)
  *H04W 4/02* (2018.01)
  *H04W 56/00* (2009.01)

(52) U.S. Cl.
  CPC ...... *G01S 13/0209* (2013.01); *H04B 1/71632* (2013.01); *H04B 1/7183* (2013.01); *H04B 7/15* (2013.01); *H04W 4/023* (2013.01); *H04W 4/025* (2013.01); *H04W 56/001* (2013.01); *H04B 2201/71636* (2013.01)

(58) Field of Classification Search
  CPC .... G01S 5/021; G01S 13/0209; G01S 5/0205; G01S 5/14; H04B 1/71632; H04B 1/7183; H04B 7/15; H04B 2201/71636; H04B 7/212; H04B 7/2678
  See application file for complete search history.

(56) References Cited

U.S. PATENT DOCUMENTS

| | | | |
|---|---|---|---|
| 10,064,012 B1 | 8/2018 | Boston et al. | |
| 11,201,981 B1 | 12/2021 | Suiter et al. | |
| 11,411,599 B2* | 8/2022 | Subraveti | H04W 56/00 |
| 11,852,713 B1* | 12/2023 | Bloechl | G01S 13/343 |
| 2010/0277284 A1 | 11/2010 | Brown et al. | |
| 2011/0170523 A1 | 7/2011 | Chen | |
| 2014/0111313 A1 | 4/2014 | Wild et al. | |
| 2014/0266907 A1 | 9/2014 | Taylor, Jr. et al. | |
| 2017/0128814 A1 | 5/2017 | Ianni et al. | |
| 2017/0131383 A1 | 5/2017 | Bartov et al. | |
| 2017/0135063 A1 | 5/2017 | Bartov et al. | |
| 2018/0088186 A1 | 3/2018 | Bhattacharyya | |
| 2019/0244309 A1 | 8/2019 | Ottnad et al. | |
| 2020/0041603 A1 | 2/2020 | Stephens et al. | |
| 2020/0154246 A1 | 5/2020 | Ganz et al. | |
| 2020/0201295 A1 | 6/2020 | Ottnad et al. | |
| 2020/0201303 A1 | 6/2020 | Kiefer et al. | |
| 2020/0208989 A1 | 7/2020 | Ottnad et al. | |
| 2020/0218235 A1 | 7/2020 | Kiefer et al. | |
| 2021/0105736 A1 | 4/2021 | Tancerel et al. | |
| 2022/0210607 A1 | 6/2022 | Bollard | |
| 2022/0276670 A1 | 9/2022 | Fabre | |
| 2023/0063193 A1 | 3/2023 | Wahl | |

FOREIGN PATENT DOCUMENTS

| | | |
|---|---|---|
| CN | 103097905 A | 5/2013 |
| CN | 105682221 A | 6/2016 |
| CN | 106211310 A | 12/2016 |
| CN | 106324561 A | 1/2017 |
| CN | 106526616 A | 3/2017 |
| CN | 107371236 A | 11/2017 |
| CN | 107454670 A | 12/2017 |
| CN | 107607974 A | 1/2018 |
| CN | 107765217 A | 3/2018 |
| CN | 108351400 A | 7/2018 |
| CN | 109282811 A | 1/2019 |
| DE | 102017120381 A1 | 3/2019 |
| JP | 2011145111 A | 7/2011 |
| KR | 20120008705 A | 2/2012 |
| KR | 101797231 B1 | 11/2017 |
| WO | 2009072089 A1 | 6/2009 |
| WO | 2014013667 A1 | 1/2014 |
| WO | 2015187991 A1 | 12/2015 |
| WO | 2016140792 A1 | 9/2016 |
| WO | 2017196583 A2 | 11/2017 |
| WO | 2018073421 A2 | 4/2018 |
| WO | 2018073422 A2 | 4/2018 |
| WO | 2018172721 A1 | 9/2018 |
| WO | 2019048149 A1 | 3/2019 |
| WO | 2019048151 A1 | 3/2019 |
| WO | 2019048152 A1 | 3/2019 |
| WO | 2019048153 A1 | 3/2019 |
| WO | 2019052742 A1 | 3/2019 |

OTHER PUBLICATIONS

Lu Jingyu et al., "Design of indoor positioning system for mobile robot based on ultra-wideband," English Abstract, Application of Electronic Technique, vol. 43, No. 5, p. 25-28, 2017, Total p. 04.

* cited by examiner

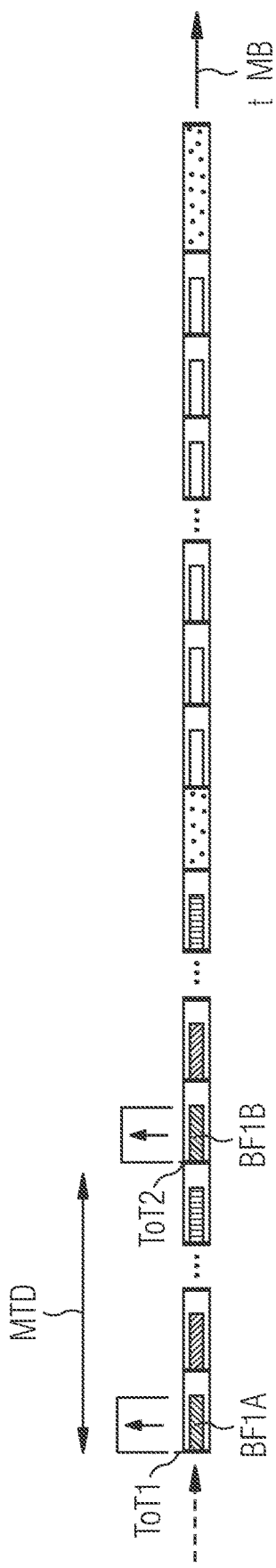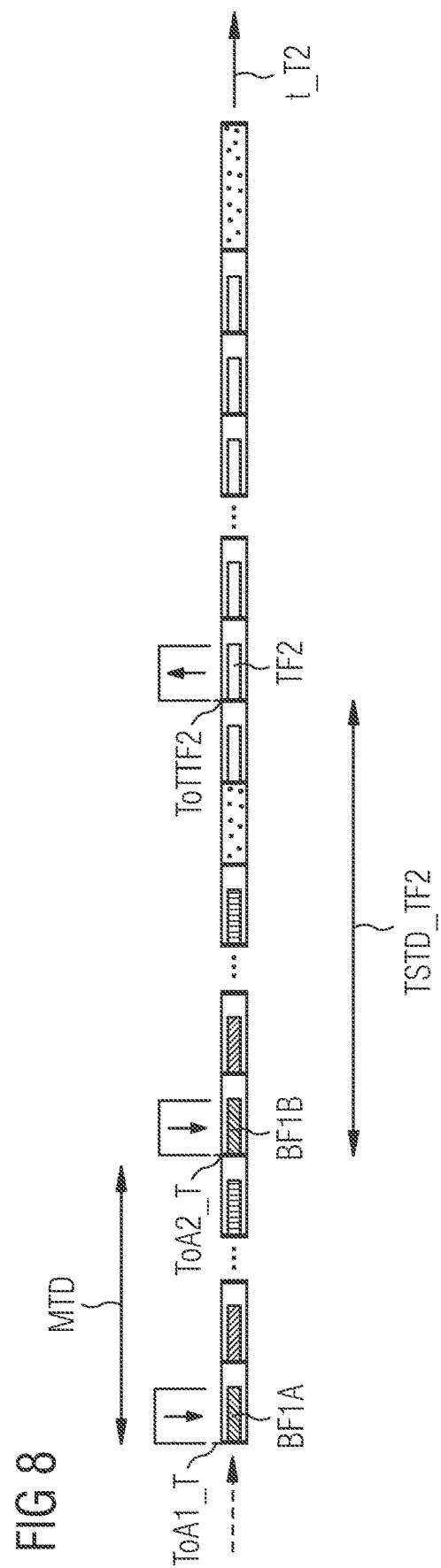

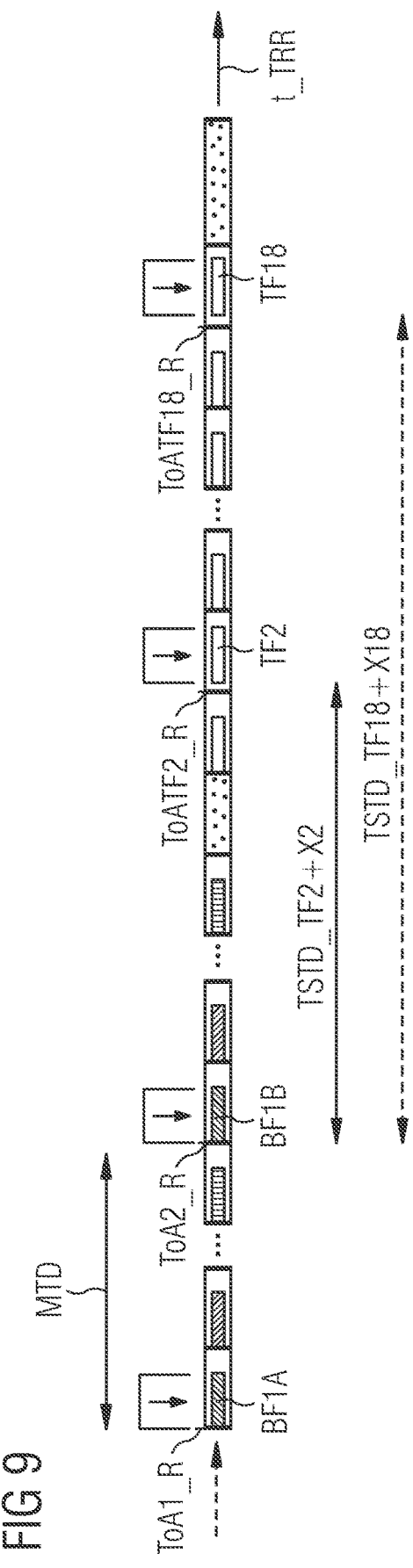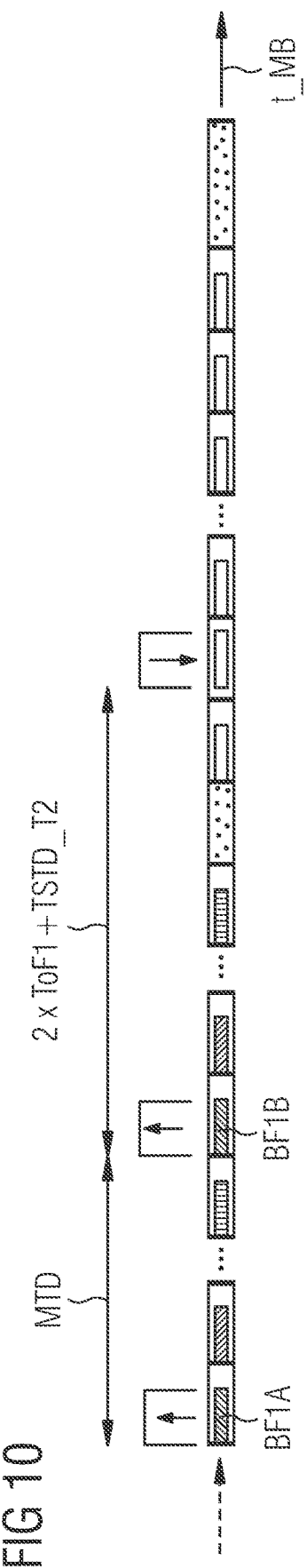

ULTRA-WIDEBAND LOCATION SYSTEMS AND METHODS

CROSS-REFERENCE TO RELATED APPLICATIONS

This application is a continuation application of U.S. patent application Ser. No. 17/604,944, filed on Oct. 19, 2021, which is a national stage application of International Application No. PCT/EP2020/060911, filed on Apr. 17, 2020, which claims priority to International Application No. PCT/IB2019/000745, filed on Apr. 19, 2019, which applications are hereby incorporated herein by reference.

TECHNICAL FIELD

The present disclosure relates generally to localizing a mobile tag device also called a "marker". Moreover, the present disclosure relates generally to implementing an ultra-wideband location system based on communicating ultra-wideband signals between the mobile tag device and stationary devices. Specifically, the present disclosure relates to (in particular indoor) ultra-wideband location methods and systems.

BACKGROUND

Knowing the indoor position of an object can be an essential functional requirement for applications such as industrial or commercial storage handling, fabricating in so called smart factories, or motion detection of physical gestures. For this purpose, indoor location systems are developed that provide position information with an accuracy down to several centimeters or millimeters.

Ultra-wideband (UWB) location systems use UWB signals to measure the distance between components of the UWB location systems specifically the mobile tag devices and stationary devices. Knowing distances of a mobile tag device to some stationary devices enables a determination of the position of the mobile tag device in two-dimensional (2D) or three-dimensional (3D) spaces. For example, in indoor environments, such UWB location systems can be used, for tracking workpieces, worktools, workers, packages, shopping carts etc. Aspects to be considered when operating a UWB location system include a localizing accuracy, a frequency at which the localizing can be repeated (also referred to as location rate), and the number of mobile tag devices that can be located with one UWB location system.

UWB location systems are usually based on well-defined emission time points of the UWB signals and a precise measurement of reception time points. Precise timings of the emission and reception of the UWB signals are required to allow measurements such as time-of-flight (ToF) measurements (also referred to as time-of-arrival (ToA) measurements) or time-difference-of-arrival (TDoA) measurements with a required accuracy. Repeating the measurements at a location rate allows further tracking a movement of the mobile tag device. When increasing the location rate, the temporal resolution of the tracked movement increases while the time for exchanging UWB signals decreases.

Generally, a location system is based on a location rate frame format defining temporally the respective activities performed usually for one cycle of the location measurement. Herein, this is also referred to as a location protocol. The location protocol defines essentially a maximum location rate at which localizing measurements can be repeated.

The location system is further based on a UWB frame format that defines the UWB signal with respect to its content, i.e., the data included in a UWB signal. The UWB frame format defines the amount of time needed for one UWB signal and the amount of information transmitted with that UWB signal.

Patent Application Publication No. US 2016/0100289 A1 discloses a localization and tracking system for determining the positions of mobile wireless devices using inter alia a UWB technology. Patent Application Publication No. US 2015/0356332 A1 discloses, for example, motion sensors based on UWB technology for performance analysis in sports.

Patent Application Publication No. WO 2017/178779 A1 relates to calibrating an indoor and outdoor position measurement system. Specifically, it refers to standard ToF measurements and compensated ToF measurements to enable parabola-based position calculation. Patent Application Publication No. US 2009/0243934 A1 discloses further a reference tag transmission from a known location for synchronizing independent spatially-located clocks of stationary receiver/monitoring stations. Thereby, an interarrival time interval between a pulse pair of UWB pulses is used.

Patent Application Publication No. US 2015/0303991 A1 discloses a UWB receiver with time drift correction. Patent Application Publication No. US 2015/0295620 A1 discloses a method for determining arrival time of a UWB pulse at a receiver. Patent Application Publication No. US 2015/0280758 A1 discloses a pulsed multi-channel UWB receiver. Furthermore, U.S. Pat. No. 7,492,316 B1 discloses a wireless time reference system that uses an interim arrival time interval between a pair of UWB pulses as a timing metric. Based thereon, a timing correction can be performed so that time-of-arrival information can be used to determine object location.

For completeness, in the field of RFID tracking, Patent Application Publication No. US 2014/0111313 A1 discloses methods for enabling low-power RFID communication. Thereby, the synchronization of internal clocks is used with respect to periodic signals containing beacon signals. Patent Application Publication No. US 2010/0277284 A1 discloses data separation in high density RF signal environments. Specifically, data separation is disclosed that can be employed when receiving and processing RFID tag data in those RF signal environments, e.g., when multiple RFID tags are tracked.

Thus, the present disclosure is directed, at least in part, to improving or overcoming one or more aspects of prior systems.

SUMMARY

Embodiments provide a real-time location method for determining positions of one or more tag devices. The method comprises the steps:

sending ultra-wideband beacon frames from a master beacon device and one or more beacon repeater devices, wherein the ultra-wideband beacon frames are transmitted as interleaved pairs of ultra-wideband beacon frames, wherein each interleaved pair is sent either from the master beacon device or the one or more beacon repeater devices, and each interleaved pair includes a first ultra-wideband beacon frame and a second ultra-wideband beacon frame, and for each interleaved pair, the first ultra-wideband beacon frame and the second ultra-wideband beacon frame are transmitted with a master time delay;

receiving at least one of the interleaved pairs of ultra-wideband beacon frames with the one or more tag devices;

receiving at least one of the interleaved pairs of ultra-wideband beacon frames with the one or more beacon repeater devices;

receiving at least one of the interleaved pairs of ultra-wideband beacon frames with one of a plurality of tag response receptor units (generally: with the plurality of tag response receptor units);

sending ultra-wideband tag response frames from the one or more tag devices, and receiving at least one of the ultra-wideband tag response frames with the one of the plurality of tag response receptor units (generally: with the plurality of tag response receptor units).

In the real-time location method, the sending and receiving is performed using an exchange protocol that defines a location rate frame format that includes:

a beacon section including a series of time slots, wherein the time slots are respectively associated to one of the first ultra-wideband beacon frame and the second ultra-wideband beacon frame of an interleaved pair, such that a separation in time of the time slots associated to each of the interleaved pair is given by the master time delay, and wherein, between time slots assigned to the first ultra-wideband beacon frame and the second ultra-wideband beacon frame of a first one of the interleaved pairs, which includes an initial one of the ultra-wideband beacon frames within the beacon section, there is an array of time slots that are respectively assigned to the first ultra-wideband beacon frames of the remaining pairs; and a tag response section including a sequence of time slots, wherein the time slots are respectively associated to one of the ultra-wideband tag response frames.

The real-time location method further comprises the step of determining positions of one or more tag devices by time measurements based on the ultra-wideband tag response frames received at the plurality of tag response receptor units.

In some embodiments of the real-time location method, the beacon section includes a time slot for each of both of the ultra-wideband beacon frames of the interleaved pairs such that the beacon section has a length of at least the master time delay.

In some embodiments of the real-time location method, the beacon section includes a time slot for only one of the first ultra-wideband beacon frame and the second ultra-wideband beacon frame of each interleaved pair such that the beacon section and the tag response section together have a length of at least the master time delay.

In some embodiments of the real-time location method, for successive location rate frames subject to the location rate frame format, there are the time slots of the tag response section and the time slot for only one of the first ultra-wideband beacon frame and the second ultra-wideband beacon frame of each interleaved pair between the time slots assigned to two initial ultra-wideband beacon frames of the beacon sections of the successive location rate frames.

In some embodiments of the real-time location method, determining positions of one of the one or more tag devices includes:

determining path time periods, wherein each path time period is associated to any one of the two successive ultra-wideband beacon frames, the respective ultra-wideband tag response frame, and a transmission path from the master beacon device to one of the plurality of tag response receptor units, deriving accumulated time-of-flight periods from the path time periods indicating a cumulated signal propagation time for one of the two successive ultra-wideband beacon frames and the ultra-wideband tag response frames along the transmission paths, and determining distance values associated to the tag device positions from the accumulated time-of-flight periods and a plurality of installation position data representing the distances between each of the plurality of tag response receptor units and the master beacon device.

In some embodiments, the real-time location method further comprises the steps:

setting the master time delay between the first ultra-wideband beacon frame and the second ultra-wideband beacon frame of the interleaved pair based on a master clock provided in the master beacon device, and transmitting an interleaved pair with the master beacon device at respective time slots of the beacon section;

receiving the interleaved pair with a tag device to be located;

calibrating a tag clock of the tag device to be located with respect to the master clock using the master time delay between the first ultra-wideband beacon frame and the second ultra-wideband beacon frame of the received interleaved pair;

receiving the interleaved pair respectively with the plurality of tag response receptor units;

calibrating receptor clocks of the plurality of tag response receptor units with respect to the master clock using the master time delay between the first ultra-wideband beacon frame and the second ultra-wideband beacon frame of the received interleaved pair;

transmitting an ultra-wideband tag response frame at a time slot of the tag response section associated to the tag device to be located;

receiving the tag response frame with the plurality of tag response receptor units; and based on relative position information of the master beacon device with respect to each of the plurality of tag response receptor units, determining distance information from the tag device to be located to the master beacon device and the plurality of tag response receptor units.

In some embodiments, the real-time location method further comprises the steps:

for one of the plurality of a tag response receptor units located at the master beacon device, determining a master time-of-flight by a master time-of-flight measurement using the ultra-wideband tag response frame; and, for another one of the plurality of tag response receptor units located at a known distance from the master beacon device, deriving a time-of-flight section from the tag device to the one of the plurality of the tag response receptor units using the master time-of-flight, the known distance, and the ultra-wideband tag response frame.

In some embodiments, the real-time location method further comprises the steps:

setting the master time delay between the first ultra-wideband beacon frame and the second ultra-wideband beacon frame of the interleaved pair based on a master clock provided in the master beacon device, and transmitting an interleaved pair with the master beacon device at respective time slots of the beacon section;
receiving the interleaved pair transmitted from the master beacon device with one of the one or more beacon repeater devices;
calibrating a repeater clock of the one of the one or more beacon repeater devices with respect to the master clock using the master time delay data between the first ultra-wideband beacon frame and the second ultra-wideband beacon frame of the received interleaved pair;
transmitting an interleaved pair with the one of the one or more beacon repeater devices at respective time slots of the beacon section;
receiving the interleaved pair transmitted from the one of the one or more beacon repeater devices with a tag device to be located;
calibrating a tag clock of the tag device to be located with respect to the master clock using the master time delay between the first ultra-wideband beacon frame and the second ultra-wideband beacon frame of the received interleaved pair;
receiving the interleaved pair transmitted from the one of the one or more beacon repeater devices respectively with the plurality of tag response receptor units;
calibrating receptor clocks of the plurality of tag response receptor units with respect to the master clock using the master time delay between the first ultra-wideband beacon frame and the second ultra-wideband beacon frame of the received interleaved pair;
transmitting an ultra-wideband tag response frame at a time slot of the tag response section associated to the tag device to be located;
receiving the tag response frame with the plurality of tag response receptor units; and
based on relative position information of the one of the one or more beacon repeater devices with respect to each of the plurality of tag response receptor units, determining distance information from the tag device to be located to the one of the one or more beacon repeater devices and the plurality of tag response receptor units.

In some embodiments, the real-time location method further comprises the steps:
setting the master time delay between the first ultra-wideband beacon frame and the second ultra-wideband beacon frame of the interleaved pair based on a master clock provided in the master beacon device, and
transmitting an interleaved pair with the master beacon device at respective time slots of the beacon section;
receiving the interleaved pair transmitted from the master beacon device with the one or more beacon repeater devices;
calibrating respective repeater clocks of the one or more beacon repeater devices with respect to the master clock using the master time delay data between the first ultra-wideband beacon frame and the second ultra-wideband beacon frame of the received interleaved pair;
transmitting an ultra-wideband beacon frame with each of the one or more beacon repeater devices at respective time slots of the beacon section;
receiving the ultra-wideband beacon frames transmitted from the one or more beacon repeater devices with a tag device; and
based on relative position information of the master beacon device and the one or more beacon repeater devices, determining distance information from the tag device to the master beacon device and each of the one or more beacon repeater devices with a time-difference-of-arrival analysis of tag beacon time points at the tag device with respect to respective beacon slots.

In some embodiments of the real-time location method, in the location rate frame, there is at least one of
a free slot between the beacon section and the tag response section, and
a random access slot following the tag response section.

In some embodiments of the real-time location method, the time slots in the beacon section and/or the tag response section include a buffer time window between ultra-wideband frames of successive slots that is not used for transmission of ultra-wideband signals, and/or
a temporal slot length of each of the time slots in the beacon section and/or the tag response section is longer than a temporal frame length of the ultra-wideband frame.

Further embodiments provide a real-time location system for determining positions of tag devices by time-difference-of-arrival measurements. The real-time location system includes:
a) an exchange protocol for sending and receiving ultra-wideband frames,
wherein the sending and receiving ultra-wideband frames includes
sending ultra-wideband beacon frames from a master beacon device and one or more beacon repeater devices, wherein the ultra-wideband beacon frames are transmitted as interleaved pairs of ultra-wideband beacon frames, wherein each interleaved pair is sent either from the master beacon device or one of the one or more beacon repeater devices, and each interleaved pair includes a first ultra-wideband beacon frame and a second ultra-wideband beacon frame, and for each interleaved pair, the first ultra-wideband beacon frame and the second ultra-wideband beacon frame are transmitted with a master time delay;
receiving at least one of the interleaved pairs of ultra-wideband beacon frames with the one or more tag devices;
receiving at least one of the interleaved pairs of ultra-wideband beacon frames with the one or more beacon repeater devices;
receiving at least one of the interleaved pairs of ultra-wideband beacon frames with one of a plurality of tag response receptor units;
sending ultra-wideband tag response frames from the one or more tag devices, and
receiving at least one of the ultra-wideband tag response frames with the one of the plurality of tag response receptor units, and
wherein the exchange protocol defines a location rate frame format that includes:
i) a beacon section comprising a sequence of time slots, wherein the time slots are respectively associated one of the first ultra-wideband beacon frame and the second ultra-wideband beacon frame of interleaved pair such that a separation in time of the time slots associated to each of the interleaved pair is given by the master time delay, and
wherein, between time slots assigned to the first ultra-wideband beacon frame and the second ultra-wideband beacon frame of an opening interleaved pair comprising an initial one of the ultra-wideband beacon frames within the beacon section, there is an array of time slots that are respectively assigned to the first ultra-wideband beacon frames of the remaining pairs; and ii) a tag response section comprising a sequence of time slots that are respectively associated to one of the ultra-wideband tag response frames;

b) a master beacon device and optionally one or more beacon repeater devices, respectively including:

i) a beacon transmission unit configured to transmit two successive ultra-wideband beacon frames at time slots of the beacon section that are associated to one of the interleaved pairs, and ii) a master clock defining a master time to ensure the separation of the two ultra-wideband beacon frames to be the master time delay or a repeater clock calibrated to the master clock, respectively;

c) a plurality of tag devices, each tag device including:

i) a tag clock defining a tag time that is specific for the respective tag device, wherein the tag time is calibrated with respect to the master time using the master time delay, ii) a reception unit configured to receive the two successive ultra-wideband beacon frames sent from the master beacon device or from one of the one or more beacon repeater devices at time slots of the beacon section, and iii) a tag response emission unit configured to transmit an ultra-wideband tag response frame at a time slot of the tag response section;

d) a plurality of tag response receptor units, each including:

i) a receptor clock defining a respective receptor time for the respective tag response receptor unit wherein the receptor time is calibrated with respect to the master time using the master time delay, and ii) wherein each tag response receptor unit is configured to receive the ultra-wideband tag response frame sent from the tag device at the respective time slot of the tag response section; and e) at least one distance determination unit including:

i) a calculation unit configured to, for continuously performed location rate frames and for each of the tag devices:

determine path time periods for each of the tag devices, wherein each path time period is associated to any one of the two successive ultra-wideband beacon frames, the respective ultra-wideband tag response frame, and a transmission path from the master beacon device or one of the one or more beacon repeater devices to one of the plurality of tag response receptor units, derive accumulated time-of-flight periods from the path time periods indicating a cumulated signal propagation time for one of the two successive ultra-wideband beacon frames and the ultra-wideband tag response frames along the transmission paths, and determine distance values associated to the tag device positions from the accumulated time-of-flight periods and a plurality of installation position data representing optionally the distances between each of the plurality of tag response receptor units and the beacon transmission unit of the master beacon device or the one of the one or more beacon repeater device.

In some embodiments of the real-time location system, the sending and receiving of ultra-wideband frames is based on an ultra-wideband frame format that includes a start frame entry, and at least one of the reception units of the tag device and the tag response receptor unit is configured to detect the start frame entry included in an ultra-wideband frame and associate a time point to the respective ultra-wideband frame; and/or wherein the ultra-wideband frame format includes a payload entry on an ultra-wideband reference beacon frame, a reference beacon slot, and/or a reference beacon source, at least one of the plurality of tag devices is configured to select one of the ultra-wideband beacon frames received from the master beacon device and the one or more beacon repeater devices as the ultra-wideband reference beacon frame, transmit an ultra-wideband tag response frame with temporal reference to that ultra-wideband reference beacon frame, and include information on the ultra-wideband reference beacon frame, the respective reference beacon slot, and/or the respective reference beacon source in the ultra-wideband tag response frame, and at least one of the reception units of the tag response receptor unit is configured to read the payload entry on the ultra-wideband reference beacon frame, the reference beacon slot and/or the reference beacon source from the ultra-wideband tag response frame, and communicate the same to the at least one distance determination unit.

In some embodiments of the real-time location system, for a calibration of a clock to the master time, the tag device, the receptor device, or the one or more beacon repeater devices comprises:

a calibration and calculation unit configured to detect the time delay between the time points associated to the first of the two successive ultra-wideband beacon frames of an interleaved pair and the time point associated to the second of the two successive ultra-wideband beacon frames and to adapt the clock time such that the detected time delay corresponds to the master time delay.

Yet other embodiments provide a real-time location system (RTLS) for determining positions of tag devices.

The RTLS includes a master beacon device, a plurality of tag devices, a plurality of tag response receptor units, and (at least one) distance determination unit.

The master beacon device includes:

i) a beacon transmission unit configured to transmit two successive beacon frames. The successive beacon frames include a first beacon frame transmitted at a first beacon transmission time point and a second beacon frame transmitted at a second beacon transmission time point, ii) a master clock defining a master time, and iii) a master storage unit configured to store therein a master time delay data.

The two successive beacon frames are transmitted with a master time delay that corresponds to the master time delay data.

A tag device of the plurality of tag devices includes:

i) a tag clock defining a tag time that is specific for the respective tag device, ii) a reception unit configured to receive the two successive beacon frames sent from the master beacon device, determine a first tag beacon time point and a second tag beacon time point for the receiving of the two successive beacon frames at the respective tag device, and generate a tag-specific reception time delay data from the first tag beacon time point and the second tag beacon time point, iii) a tag data storage unit configured to store therein the master time delay data, a reference time point associated with the receiving of one of the beacon frames being used as a reference beacon frame, and a tag-specific emission time delay data specifically associated to the respective tag device and the reference time point, iv) a calibration and calculation unit configured to calibrate the tag clock with respect to the master time by comparing the tag-specific reception time delay data and the master time delay data, and v) a tag response emission unit configured to derive a tag-specific emission time delay from the tag-specific emission time delay data for the calibrated tag clock and the reference time point; and emit a tag response frame after waiting for the tag-specific emission time delay upon the reference time point;

A tag response receptor unit of the plurality of tag response receptor units includes a receptor clock defining a respective receptor time. Each tag response receptor unit is configured receive a plurality of the tag response frames sent from the plurality of the tag devices and determine a plurality of receptor response time points for the arrival times of the tag response frames at the respective response receptor unit, wherein each receptor response time point is specific for the respective tag response receptor unit and the respective tag device due to the tag-specific emission time delay.

The distance determination unit includes:

i) a data storage unit configured to store therein the tag-specific emission time delay data, and a plurality of installation position data representing the positions of each of the plurality of tag response receptor units and the beacon transmission unit of the master beacon device, and ii) a calculation unit configured to, for a selected tag device, determine distance values associated to the position of the selected tag device using the first or second beacon transmission time point, the receptor response time points, and the tag-specific emission time delay data of the selected tag device and optionally the master time delay data and the plurality of installation position data.

For example, the calculation unit is configured to, for a selected tag device, determine path time periods lapsed between a time point associated with the transmitting of the two successive beacon frames and the receptor response time points for the arrival times of the tag response frames;

derive accumulated time-of-flight periods by subtracting the tag-specific emission time delay of the selected tag device from the determined path time periods, wherein each accumulated time-of-flight period is associated to a transmission path from the master beacon device to one of the respective response receptor units via the selected tag device; and determine distance values associated to the position of the selected tag device from the determined accumulated time-of-flight periods and the plurality of installation position data.

The "real-time" in a real time location system means herein hardware and software systems subject to a "real-time constraint", from event to system response. Real-time systems and especially the mentioned RTLS must guarantee response within specified time constraints. The correctness of these types of systems depends on their temporal aspects as well as their functional aspects. A system which cannot guarantee a response within any timeframe, although typical or expected response times may be given, is not suitable and not within the meaning of RTLS.

Various other embodiments provide a method for providing distance values between a tag device and a plurality of tag response receptor units of a real-time location system. The method includes: operating a master beacon device to transmit successive beacon frames whereby there is set a master time delay between two neighboring of the successive beacon frames;

operating the tag device and the tag response receptor units to receive the successive beacon frames and to calibrate clocks of the tag device and the tag response receptor units using the master time delay;

operating the tag device to emit a tag response frame at a preset tag-specific emission time delay with respect to a transmission time point associated with the receiving of a reference beacon frame, the reference beacon frame being one of the successive beacon frames;

operating the tag response receptor units to receive the tag response frame and to determine receptor response time points for the arrival times of the tag response frame at the respective response receptor units, wherein each receptor response time point is specific for the respective tag response receptor unit and the tag device due to the tag-specific emission time delay; and determining the distance values associated to the position of the tag device from the receptor response time points and installation position data representing the position of each of the plurality of tag response receptor units and the master beacon device.

Yet various other embodiments provide a method for providing distance values between a tag device and a plurality of tag response receptor units of a real-time location system. The method includes the steps:

transmitting two successive beacon frames at a first beacon transmission time point and a second beacon transmission time point with a beacon transmission unit of a master beacon device, wherein the two successive beacon frames are transmitted with a master time delay that corresponds to a master time delay data;

receiving the two successive beacon frames sent from the master beacon device at the tag device, determining a first tag beacon time point and a second tag beacon time point for the receiving of the two successive beacon frames at the tag device, generating a tag-specific reception time delay data from the first tag beacon time point and the second tag beacon time point, calibrating a tag time of the tag device to a master time of the master beacon device by comparing the tag-specific reception time delay data and the master time delay data, deriving a tag-specific emission time delay from preset tag-specific emission time delay data for the calibrated tag time, emitting a tag response frame from the tag device after waiting for the tag-specific emission time delay upon a reference time point associated with the receiving of one of the two successive beacon frames being used as reference beacon frame, receiving the tag response frames sent from the tag device, determining a plurality of receptor response time points for the arrival times of the tag response frame at the respective response receptor units, wherein each receptor response time point is specific for the respective tag response receptor unit and the tag device due to the tag-specific emission time delay, determining path time periods lapsed between a transmission time point associated with the transmitting of the reference beacon frame and the receptor response time points for the arrival times of the tag response frame at the respective response receptor units, deriving accumulated time-of-flight periods by subtracting the tag-specific emission time delay of the tag device from the determined path time periods, wherein each time-of-flight period is associated to a transmission path from the master beacon device to one of the respective response receptor units via the tag device, and determining the distance values associated to the position of the selected tag device from the determined accumulated time-of-flight periods and installation position data representing the position of each of the plurality of tag response receptor units and the beacon transmission unit of the master beacon device.

Some embodiments provide a method for determining the positions of a plurality of tag devices. The method includes the steps:

providing a plurality of tag response receptor units;

providing a plurality of tag devices, each associated with a specific tag-specific emission time delay data differing from the remaining tag-specific emission time delay data;

performing the method for providing distance values between a tag device and a plurality of tag response receptor units of a real-time location system for each of the plurality of tag devices; and deriving the position for each of the plurality of tag devices from the distance values associated to the position of the respective tag device.

Some further embodiments provide a method for providing distance values between a tag device and a plurality of beacon transmitters including a master beacon device and a plurality of beacon repeater devices of a real-time location system. The method includes the steps:

operating a master beacon device to transmit successive beacon frames whereby there is set a master time delay between two neighboring of the successive beacon frames;

operating the tag device and the beacon repeater devices to receive the successive beacon frames of the master beacon device and to calibrate clocks of the tag device and the beacon repeater devices using the master time delay;

operating the beacon repeater devices to transmit successive beacon frames whereby the master time delay is set between two neighboring of the successive beacon frames;

operating the tag device to receive the successive beacon frames of the beacon repeater devices, and to determine tag beacon time points for the master beacon device and the beacon repeater devices; and determining the distance values associated to the position of the tag device from the tag beacon time points and installation position data representing the position of the master beacon device and the plurality of beacon repeater devices.

For example, in some embodiments, the master beacon device includes one of the plurality of tag response receptor units, such that the respective installation position data indicates the same position for the tag response receptor unit of the master beacon device and for the beacon transmission unit of the master beacon device (e.g., no distance between the tag response receptor unit of the master beacon device and the beacon transmission unit of the master beacon device), and wherein, for the master beacon device, the master clock is optionally the respective receptor clock. Optionally, the distance determination unit can be configured to calculate a time-of-flight and/or a distance between the master beacon device and a selected tag device based on the first or second beacon transmission time point, the receptor response time points at the master beacon device, and the tag-specific emission time delay data of the selected tag device and optionally the master time delay data.

In some embodiments, at least one of the plurality of tag response receptor units is further configured to receive the two beacon frames sent from the master beacon device at respective receptor beacon time points, and generate a receptor-specific time delay data from the receptor beacon time points, and the at least one of the plurality of tag response receptor units further includes:

a calibration and calculation unit configured to calibrate the respective receptor clock with respect to the master clock by comparing the receptor-specific time delay data and the master time delay data, such that receptor response time points for the arrival times of the tag response frames are based on the calibrated receptor time.

In some embodiments, the RTLS further includes at least one beacon repeater device that comprises one of the plurality of tag response receptor units and a beacon transmission unit within a housing to form an integrated device configured as an anchor device that is mountable to a wall or ceiling or any other stationary installation. The at least one beacon repeater device may be configured to transmit successive beacon frames separated by the master time delay using the receptor clock being calibrated to the master clock. Then, at least one of the plurality of tag devices may be configured to select one of the beacon frames received the at least one beacon repeater device as a reference beacon frame, derive the tag-specific emission time delay from the tag-specific emission time delay data for the calibrated tag clock and a reference time point, wherein the reference time point is associated with the receiving of the selected beacon frame;

emit a tag response frame after waiting for the tag-specific emission time delay upon the reference time point; and include information on the reference beacon frame, the respective reference beacon slot, and/or the repeater beacon device in the tag response frame.

In some embodiments, the RTLS further includes a control unit connected with the plurality of response receptor units to exchange data, wherein the control unit includes the distance determination unit, which is configured to receive timing data from the plurality of response receptor units based on which the distance values are determined for the positions of the tag devices.

In some embodiments, the tag-specific emission time delay is associated with a tag beacon time point, e.g., a predetermined one of the first tag beacon time point and the second tag beacon time point, as reference time point. For example, the tag-specific emission time delay is a time period to be waited after the reception of the second one of two successive beacon frames at the second tag beacon time point. In addition or alternatively, each receptor response time point is furthermore specific for the respective tag response receptor unit and the respective tag device due to a relative geometric position of the beacon transmission unit, the respective tag device, and the respective tag response receptor unit.

As will be understood in the context of the present application, the first tag beacon time point and the second tag beacon time point relate to a pair of successive beacon frames received at the respective tag device and originating from the same source.

As disclosed herein, the use of a master beacon device may be sufficient for various embodiments. Then, the pair of successive beacon frames originate from and, accordingly, the first tag beacon time point and that second tag beacon time point (or generally, a time point associated with the receiving of at least one of the two successive beacon frames) relate to the master beacon device.

However, the herein disclosed location rate frame format can provide a beacon section with additional time slots associated to beacon repeater devices. In the case that a master beacon device and one or more beacon repeater devices are operated, a plurality of beacon frames are emitted each within respective time slots of the beacon section. Accordingly, a tag device may receive a plurality of beacon frames and, accordingly, the tag device may be configured to select a specific pair of beacon frames associated with the master beacon device or one of the plurality of beacon repeater devices for calibration.

Similarly, the tag device may be configured to select a specific beacon frame regarding the tag-specific emission time delay. The selected beacon frame of the master beacon device or the plurality of beacon repeater devices can be referred to as a reference beacon frame; the respective master beacon device or beacon repeater device as a reference beacon source, and the respective slot in the location rate frame format as reference beacon slot.

The selection(s) may be based, for example, on the signal strength and/or the signal quality. The tag device may be further configured to adapt the tag-specific emission time delay based on that selected reference beacon device such that the tag response frame is emitted during the time slot associated with the tag device within the location rate frame format. Generally, the tag device may be further configured to derive, from tag-specific emission time delay data, the tag-specific emission time delay needed for the respective selected reference beacon device.

For example, if the frames of a beacon repeater device associated with time slots respectively directly following the time slots associated with the master beacon device have a preferred signal quality, the respective beacon repeater device can become the selected reference beacon device. In this case, the tag-specific emission time delay may be set shorter by the duration of one time slot than a tag-specific emission time delay would be if instead the master beacon device would have been used as reference beacon device.

In case that the reference beacon device can also detect the tag response frame, a time-of-flight measurement can be performed for the reference beacon frame/the reference beacon device (i.e., the selected master beacon device or beacon repeater device) s. Based on a time-of-flight measurement with the reference beacon device, time-of-flight measurements for other tag response receptor units (installed in any one of the master beacon device, the beacon repeater devices or specific tag response receptor units) may be performed, as explained herein.

It will be moreover understood that, in the analysis of a respective accumulated time-of-flight to a tag response repeater unit, a beacon transmission time point of the respectively selected one of the master beacon device or the beacon repeater device will be used.

It is noted that in view of the above, a payload entry in the underlying UWB frame format may include data regarding the respective source (UWB emitter such as master beacon device, beacon repeater device, or tag device), e.g. in form of an identification code (ID) of the respective emitter.

In addition, the payload may provide an entry for data on the selected reference beacon device. That entry includes information entered by the tag device into the emitted tag frames to indicate which beacon frame or repeater frame was used for a time reference when emitting the tag response frame in the correct time slot, specifically for adapting the tag-specific emission time delay. It will be understood that this information on the used reference beacon device will ensure that a consistent accumulated time-of-flight can be derived and further processed in line with the above. Specifically, this information is used to apply the correct reference beacon for the time-of-flight (ToF) measurement for localization calculations.

In some embodiments of the RTLS, the calculation unit is configured to, for a selected tag device,
  determine path time periods lapsed between a transmission time point associated with the transmitting of the reference beacon frame and the receptor response time points for the arrival times of the tag response frames at the tag response receptor units;
  derive accumulated time-of-flight periods by subtracting the tag-specific emission time delay of the selected tag device from the determined path time periods, wherein each accumulated time-of-flight period is associated to a transmission path from the master beacon device (or optionally a selected beacon repeater device) to one of the respective response receptor units via the selected tag device, wherein the accumulated time-of-flight period for the arrival times of the tag response frame at the master beacon device (or optionally at the selected beacon repeater device) is twice a master time-of-flight period between the master beacon device and the selected tag device (or optionally twice a repeater time-of-flight period between the selected beacon repeater device and the selected tag device);
  subtract the master (or repeater) time-of-flight period from each of the remaining accumulated time-of-flight periods, thereby deriving receptor time-of-flight periods associated to the tag response receptor units and the tag device; and
  determine the position of the selected tag device from the determined receptor time-of-flight periods and optionally the master time-of-flight period by a time-of-flight analysis using the plurality of installation position data.

In some embodiments of the RTLS, the calculation unit is configured to, for a selected tag device, determine path time periods lapsed between a transmission time point associated with the transmitting of the reference beacon frame and the receptor response time points for the arrival times of the tag response frames;

derive accumulated time-of-flight periods by subtracting the tag-specific emission time delay of the selected tag device from the determined path time periods, wherein each accumulated time-of-flight period is associated to a transmission path from the master beacon device to one of the respective response receptor units via the selected tag device;

for the plurality of tag response receptor units, determine time-difference-of-arrival values; and determine the position of the selected tag device by performing a time-difference-of-arrival analysis using the determined time-difference-of-arrival values and the plurality of installation position data.

Optionally, if the reference time point does not coincide with the tag beacon time point of the reference beacon frame, additionally to the tag-specific emission time delay, also the time period between the reference time point and the tag beacon time point may be subtracted from the determined path time periods.

In some embodiments, the calculation unit is configured to determine path time periods that specifically lapsed between one of the first beacon transmission time point and the second beacon transmission time point, as a reference time point, and the receptor response time points and to determine accumulated time-of-flight periods by subtracting the tag-specific emission time delay and optionally the master time delay from the path time periods.

In some embodiments, the transmission of the two successive beacon frames and/or the tag response frames is performed based on an ultra-wideband frame format with multiple bits comprising:

a header portion including bits associated to at least one of frame length, data rate, and data correction, and a payload portion including bits associated to at least one of type of frame, identification of emitter, identification of reference beacon frame and/or reference beacon frame source, and data correction.

The frame format defines a so-called transmission frame and relates to the time during which one transmitter sends a series of UWB pulses as explained in more detail below. In some embodiments, the frame format does not include a bit in the payload portion that represents a beacon transmission time point, a tag beacon time point, and/or a time period such as a master time delay and tag-specific emission time delay.

In some embodiments, the tag-specific emission time delay data are preset for the plurality of tag devices such that the tag-specific emission time delays result in temporal displacements of the plurality of receptor response time points into a tag-specific time slot, and the receptor response time points are associable to the tag devices by the tag-specific emission time delay data.

In some embodiments, the tag-specific emission time delay data are set such that the temporal displacement between receptor response time points related to different tag devices is in the range from 500 μs to several milliseconds such as at least 1 ms.

In some embodiments, a location rate frame format used by the components of the location system has a duration in the range from about 1 ms to 250 ms. Generally, the duration depends on the series of successive transmissions organized in a time pattern (the location rate frame format) whose recurrence is at the location rate. In addition or alternatively, the transmission of two successive master beacon frames is performed at a location rate from about 1 ms to 250 ms.

In some embodiments, the RTLS further includes:

at least one beacon repeater device positioned at a preset repeater position (e.g. at a preset distance) and configured to receive the beacon frames and to emit repeated beacon frames.

Two repeated beacon frames are associated with time slots within a location rate frame format that are interleaved with time slots within the location rate frame format that are associated with two successive beacon frames transmitted from the master beacon device and optionally further repeater devices.

Furthermore, repeated beacon frames can be associated with time slots within a location rate frame format that are interleaved with time slots within the location rate frame format that are associated with single beacon frames transmitted from the master beacon device and optionally further repeater devices (BR) and tag frames.

The tag devices and/or tag response receptor units receiving two repeated beacon frames may use the time delay between the two repeated beacon frames for calibration. For example, two repeated successive beacon frames may be used that are emitted in one location rate frame or in successive location rate frames.

The tag devices may be configured to select one of the repeated beacon frames as reference frame and derive the tag-specific emission time delay based on a reference time point associated with the receiving of the selected repeated beacon frame.

In some embodiments, the master beacon device includes one of the tag response receptor units, such that the installation distance data (derivable from the installation position data) for the transmission path from the master beacon device via the tag device to the master beacon device is obviously zero. In other words, the installation position data indicate for the transmission path from the master beacon device via the tag device to the master beacon device a distance between a position of the transmitting the beacon frames and a position of receiving the tag response frames to be zero.

In some embodiments, the tag response frame is emitted with the same rate as the beacon frames. In some embodiments, the tag response frame may be emitted at the rate of twin beacon frames or the emission may be enabled by the tag device and blocked over periods, where localizing is not required To summarize the concepts disclosed herein, self-synchronized locations systems may include components such as a master beacon device, optionally beacon repeater devices, tag devices, and optionally tag response receptor units. The components transmit and/or receive frames such as ultra-wideband RF frames. The calibration of clocks of the components can be performed with successive beacon fames transmitted at a master time delay. In some embodiments, tag response frames are initiated with tag specific time delays. Using the calibrated clocks, arrival timing information can be derived that can be used for time-of-flight and/or time-difference-of arrival analysis. The location system may be based on a specific location rate frame format accommodating the master time delay and the tag specific time delay, thereby using only a limited number of frame transmissions per tag to be localized. The location rate frame format may further accommodate a dual purpose location system that allows device centric as well as server centric localizing approaches.

The herein disclosed concepts can provide a high performance location system because it is possible to use trilateration algorithms that are based on two-way ranging approaches. Specifically, the concepts can allow getting information on all distances from tag response receptor units (which are often completely stationary, fixedly installed devices, i.e., so called anchors) to the tag devices. In other words, the herein disclosed concepts allow converting TDoA-measurements to time-of arrival (ToA)-measurements.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIGS. 7 to 12 show schematically various actions performed during the UWB exchange by the components of the location system described in connection with FIG. 4 in line with the herein disclosed exchange protocols for tag localization;

DETAILED DESCRIPTION OF ILLUSTRATIVE EMBODIMENTS

Figure 1:
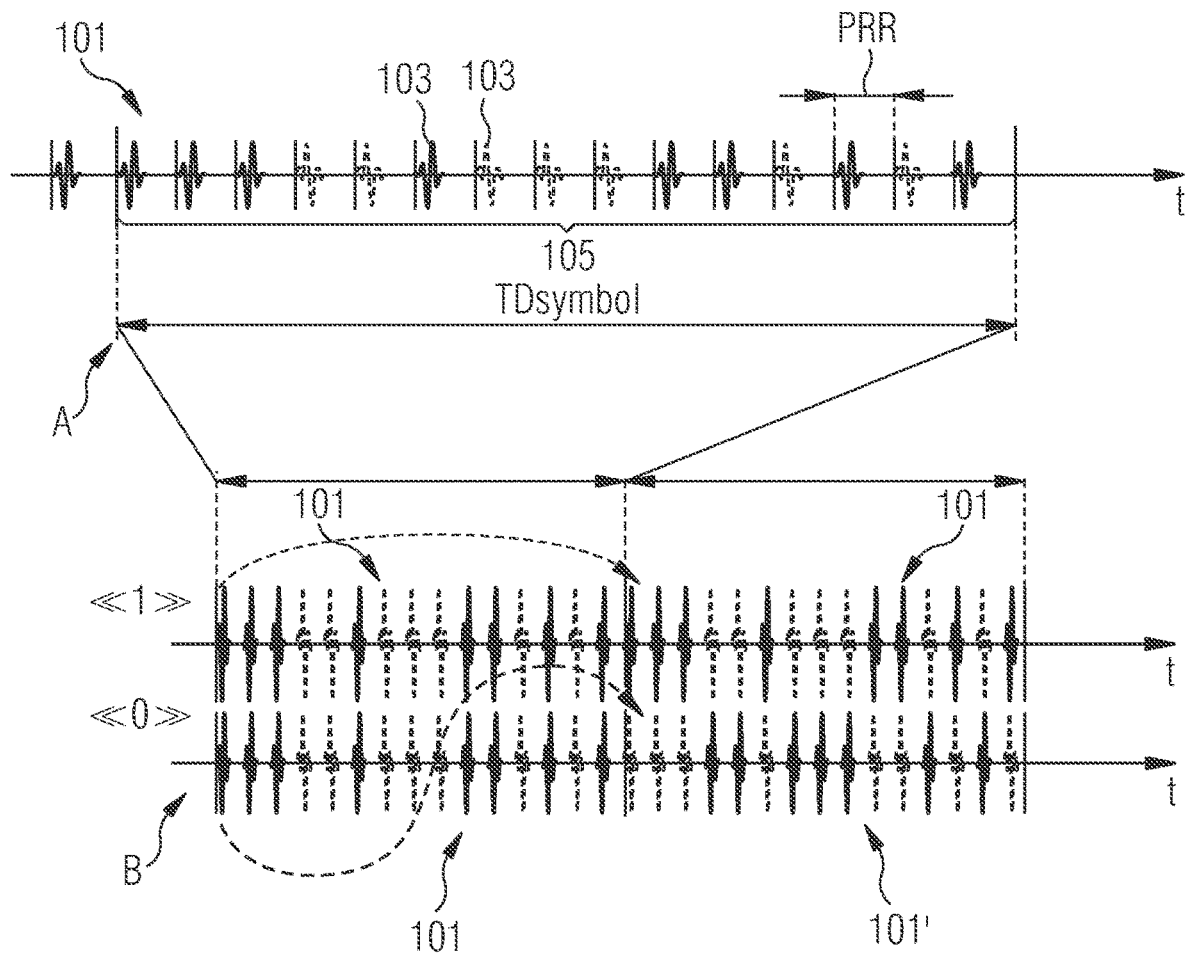
FIG. 1 shows a schematic illustration of an exemplary UWB symbol consisting of UWB pulses.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that for "two/three-way-UWB-techniques" such as disclosed in the prior art a large number of frames is sent between the participating devices. If one further increases the number of tag devices (and stationary units), the amount of frames to be exchanged will increase significantly.

In addition, the inventors realized that a short UWB frame format can increase the size of the localization area. Moreover, short frames allow more frames per time or an increased time window between frames, thereby decreasing any interference of the UWB signals or the risk of overlapping successive frames and enabling a large number of tag devices to be locatable within one location protocol.

In view of these aspects, a new UWB protocol and a new location system are proposed for high spatial resolution of tag devices. In the following, the contributing features are described at first generally and then illustrated in connection with respective figures.

UWB (Localizing) Protocol

The proposed UWB protocol is based on employing a UWB frame format having a short size and a UWB location rate frame format that allows an efficient UWB frame communication. Specifically, only a few (as a minimum two) beacon frames need to be sent from a master beacon device per location rate. In addition, only a single response frame can be sent from each tag device to be located per location rate frame.

The UWB location rate frame format defines time slots for the UWB frames of the master beacon device and the tag devices. For example, a pair of frames can be sent per location rate frame as the basis for the UWB localizing protocol. The pair of frames is herein also referred to as (twin) beacon frames or twin beacons or pair of master beacons. An emission of (twin) beacon frames is moreover referred to as a double transmission. All tag devices reply to those (twin) beacon frames. Based on time calibration and preassigned slots, the tag devices can adjust their timing versus a unique timing reference. The unique timing reference is provided by the master beacon device. Specifically, there are provided a (high precision) master clock of the master beacon device and an emission process performed with a high precision such that a master time delay between the twin beacons can be set with high accuracy. The master clock may be realized as a clock-pulse-generator or a clock-wave-generator. The master clock defines a master time which is used as the time reference for the system. The temporal distance between the twin beacon frames, if the twin beacons are detected with respective precision in time by a UWB receiver, allows calibration of any clock associated with that UWB receiver. For example, UWB receivers can be provided within the tag devices to be located, any stationary installed (or at least temporarily stationary) tag response receptor units, and also within the master beacon device and optionally repeater devices. For example, a repeater device may be calibrated by receiving the twin beacon frames and may be configured to transmit time-shifted twin beacon frames, to increase the range. In the latter case, the UWB location rate frame format also provides time slots for the repeater devices. In embodiments of tag device centric localizing, there may be no tag slots needed.

While the above provided summary referred to twin beacons as an example, the master beacon may transmit an integer number of beacon frames, e.g., to increase accuracy of the calibration. However, additional time of the location rate may then be associated to the beacon transmission. It is to be understood, however, that transmitting an integer number of beacon frames always also includes transmitting a pair of beacon frames. For simplicity, however, the description exemplarily refers herein often to two master beacons or a pair of master beacons. However, it will be recognized that the same concept can similarly be transferred to three, four or more master beacons. Obviously, emitting only two master beacons requires less time in the location frame, allowing more time for tag responses (thus enabling a larger number of tag devices) or a higher location rate. Generally, for the calibration, one measures the drift between the master clock and the receptor clock, whereby the precision of the calibration is linked to the time period between successive beacons of the same beacon emitter (master beacon device or beacon repeater device), e.g., between the first beacon and the second beacon of a twin beacon pair of two successive beacons.

It is noted that the master beacons are repeated with the location rate. Thus, the duration of a location rate frame is the temporal distance between successive "first" master beacon frames.

The location rate frame of the herein disclosed UWB localizing protocol may include a beacon section and a tag response section. [moo] The beacon section may include a sequence of time slots associated to interleaved pairs of beacon frames. Specifically, a first beacon frame and a second beacon frame of each pair are separated in time by a master time delay. Considering an opening pair within the location rate frame, the opening pair includes an initial one of all the beacon frames within the beacon section. Then, between time slots assigned to the beacon frames of the initial pair, the beacon section includes an array of time slots that are respectively assigned to the first beacon frames of the remaining pairs. Similarly, between time slots assigned to the beacon frames of a closing pair (comprising a last one of the beacon frames within the beacon section), there is an array of time slots that are respectively assigned to the second beacon frames of the remaining pairs.

The tag response section includes a sequence of time slots associated to tag response frames. Specifically, for each tag device to be localized in real time, one time slot can be given/predefined.

Generally, a time slot is a time window that is at least as long as the UWB frame format requires. Usually, there may be additional unused time periods after and/or before the respective beacon frame or tag response frame. Those unused time periods may reduce or avoid interference and enable clearer association of received UWB frames to their time slots.

Moreover, transition slots may be introduced between the beacon section and the tag response section and/or at the end of the tag response section.

Generally, such a location rate frame may be defined and form the basis for an exchange protocol for sending and receiving ultra-wideband frames based on an ultra-wideband frame format.

It is noted that a tag device may be temporarily stationary (set into a stationary position mode) and then be used as a tag response receptor unit or a repeater device. In the latter case, a temporarily stationary tag device may be additionally associated to a (repeater) time slot in the beacon section of the location rate frame.

Based on the new location protocol and as explained herein, the number of frames to be sent for localizing one tag device within one location rate period (LRT) may be 2+1 (i.e., two beacon frames and one tag response frame). For n pairs of beacon slots and m tag devices to be localized, the number of frames to be sent for localizing all tag devices within one location rate period is 2*n+1*m. This number would be the minimum number of slots required within the location rate frame format for a calibration based on twin master beacons and offering the use of (n−1) repeater devices to extend the range or improve signal performance.

UWB Communication Fundamentals

The herein disclosed concepts relate to communication in the radio frequency range using continuously repeated localizing transmissions of pulsed UWB signals following the UWB protocol. Each UWB signal is emitted according to the UWB frame format. (UWB signals are thus also referred to as UWB frames.)

Looking at the basics, each UWB signal comprises a plurality of preset and predefined series of UWB pulses. Each series represents a symbol such as "0" and "1" bits. The UWB pulses may have, for example, a broad bandwidth of 1 GHz and low energy −43 dBm/Hz. A single UWB pulse may have a time duration of, for example, 0.3 ns to 10 ns such as 3 ns (e.g. 1 ns at 1 GHz and 2 ns at 500 MHz). The UWB pulses are emitted at a UWB pulse repetition rate. Respective UWB pulse repetition frequencies generally may be in the range from several ten Hertz to several hundred Hertz such as 500 MHz. An exemplary UWB pulse repetition rate is 60 ns or 64 ns or 65 ns, corresponding to a pulse repetition frequency of about 15 MHz to 17 MHz.

A symbol may be made of only a few to hundred or more UWB pulses such as 3, 15 or 127 UWB pulses. Thereby, the UWB pulses may follow a spreading code defining polarization states of each UWB pulse, wherein the overall polarization of subsequent symbols can be used to differ between the bit states.

A UWB signal (i.e. the sequence of symbols forming the UWB frame) follows an underlying UWB frame format. The frame format defines the structure and content of the UWB signal. The frame format may include defined sections such as:

- a synchronization header (SHR) with a preamble and a start frame delimiter (SFD);
- a physical layer header (PHR) with information on the frame length, data rate, and with correction portions such as a cyclic redundancy check (PHR CRC) or a forward error correction (FEC PHR); the physical layer header is used to decode the PHY payload;
- a physical layer (PHY) payload with payload and payload corrections (payload CRC and payload FEC); data embedded in the payload may include type of frame, identifier (ID) of emitter such as master beacon device/tag device/repeater, and ID of reference beacon device (used specifically for tag frames).

For the herein disclosed concepts, it is advantageously to generally include only few data to keep the frame format as short as possible. Moreover, the spreading code may vary within different sections. The temporal duration associated with a frame format may be in the range from, for example, 1 μs to 150 μs such as about 100 is.

The UWB frames are emitted at large repetition rates. For tag devices, the repetition rate is generally governed by the location rate and may be in the range from fractions of a Hertz to several hundred Hertz. However, the tag-sided location rate may vary; for example, the location rate may be adapted to save power for quasi or momentarily stationary tag devices. For the master beacon device, the time between the twin beacons is a portion of the location rate, while the twin beacons themselves are repeated again with the location rate.

It is noted that, for the herein disclosed concepts, the start frame delimiter (SFD) can be used to detect time points associated with the reception of a frame with high precision. Similarly, the SFD can be used as a time landmark to ensure a predefined emission time point of a UWB frame.

As will be explained herein, distance information may generally be calculated based time points that were measured with a high accuracy for a calibrated time.

UWB Frequency Range

The herein disclosed concepts relate to the radio frequency range used for UWB communication. Specifically, UWB channels can be used in the range from 3 GHz to 10 GHz, e. g., in the ranges from 3.244 GHz to 4.742 GHz or from 5.944 to 10.234 GHz. Exemplary definitions of UWB channels are given in the standard "IEEE Standard 802.15.4-2015—Standard for Low-Rate Wireless Networks" such as channel 1: 3.5 GHz, channel 2: 4 GHz, channel 3: 4.5 GHz, channel 4: 4 GHZ 1 GHz bandwidth.

UWB Frame Format

The UWB protocol is based on employing a UWB frame format that is kept short. Specifically, the frame format can be timestamp-free which means that it does not include a timestamp data. Then, for example, the UWB frame does not include data entries for information on a time point of a transmission or a reception or a time duration or a distance value/result. A timestamp-free frame format can be significantly shorter than timestamp-including frame formats because including the information of timestamps would require a large number of additional bits. Not using a time stamp became possible because the calibration concept disclosed herein is based on the measurement of time difference between beacon frames in particular at the tag devices. This decentralized calibration was further enabled with UWB chips such as disclosed in the patent applications mentioned above.

Figure 2:
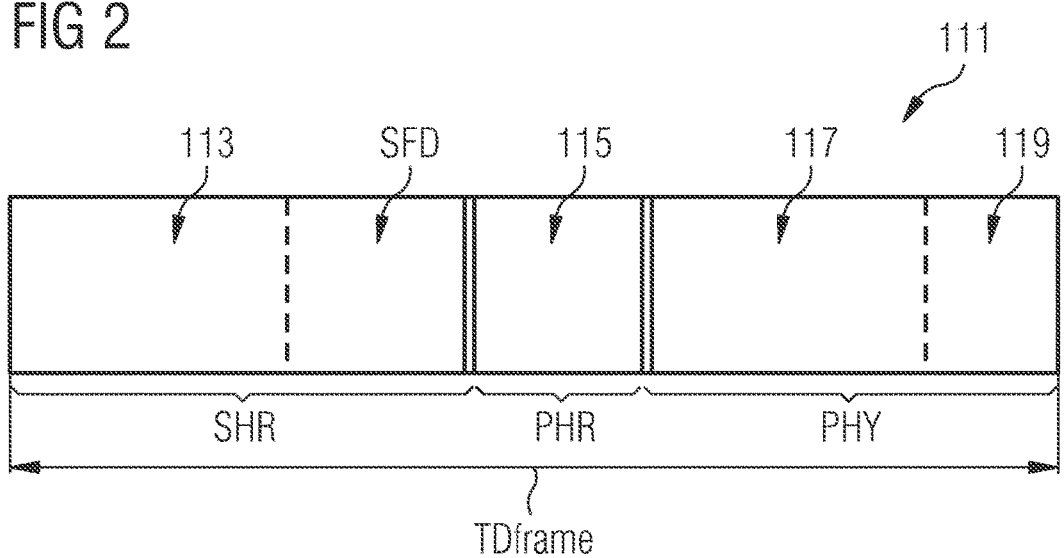
FIG. 2 shows a schematic illustration of an exemplary frame format defining a transmission frame for UWB communication.
Figure 3:
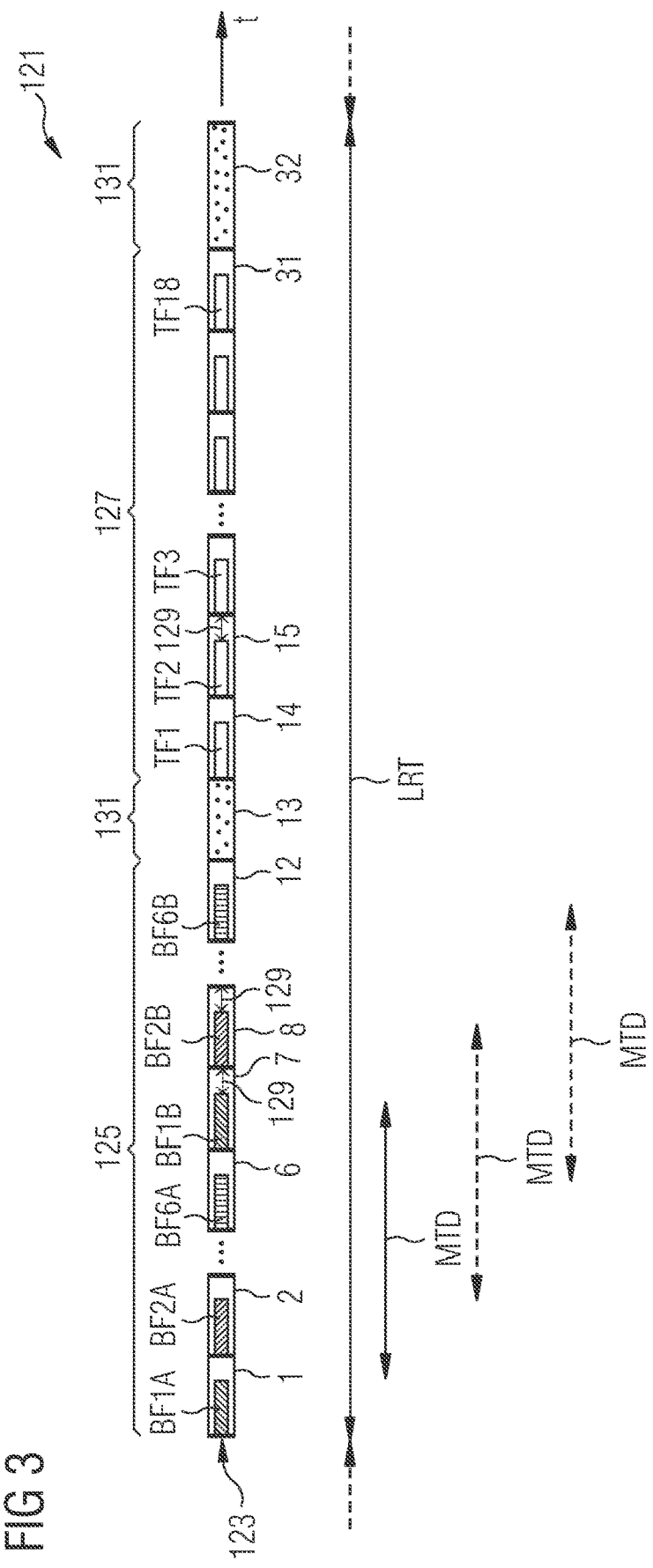
FIG. 3 shows a schematic illustration of an exemplary location rate frame as a basis for a localizing protocol.

Referring to FIGS. 1 to 3, the above described aspects of using UWB communication in location systems are illustrated schematically.

FIG. 1 illustrates the formation of unchanged and alternating bit information for exemplary symbols consisting of multiple UWB pulses along a time line t.

Specifically, in the upper part A of FIG. 1, a series 101 of several UWB pulses 103 is shown schematically. A subgroup 105 consisting of fifteen UWB pulses 103 has a predefined order of polarization states. Different polarization states of the UWB pulses 103 are illustrated by line through curves or dotted curves, indicating the polarization state by a mirrored pattern. The subgroup of fifteen UWB pulses 103 forms a symbol. The pulse repetition rate PRR is indicated with: PRR=60 ns, for example. For the example of fifteen UWB pulses, the temporal duration of a symbol TDsymbol is given by:

TDsymbol=15*60 ns=900 ns.

As shown in the lower part B of FIG. 1, an overall polarity between successive symbols may stay the same (shown by identical symbols according to series 101) or alternate (shown by symbols according to series 101 and 101'), thereby allowing to distinguish between, for example, bit «0» and bit «1». It is noted that polarization coding is one of implementations of UWB encoding known in the art.

FIG. 2 illustrates an exemplary frame format 111 consisting of multiple symbols such as shown, for example, in FIG. 1. The frame format 111 includes exemplary three portions referred to (as above as) a synchronization header SHR, a physical layer header PHR, and a physical layer payload PHY.

The synchronization header SHR is used to temporally find the frame during the reception process. The synchronization header SHR may include a preamble 113 consisting of, for example, several ten symbols. In addition, the synchronization header SHR includes a start frame delimiter SFD consisting of, for example, several ten symbols. The start frame delimiter SFD is used to define a unique timing reference within the frame to associate, for example, a specific reception time point to a received frame.

The physical layer header PHR does not need to include specific information on the frame length, data rate, but usually a correction portion 115 is included to allow correct detection of the frame. Generally, the physical layer header PHR may consist of, for example, several symbols up to several ten symbols.

The physical layer payload PHY may include a payload 117 and payload corrections 119. The payload 117 may include data such as type of frame, ID of emitter such as master beacon device/tag device/repeater. (See also the illustration above the respective time lines, for example, in FIG. 8 and FIG. 9 for the master beacon frames being used as time reference and in FIG. 11 and FIG. 12, for repeater beacon frames being used as time reference, for example, for calibration.)

In addition, the payload 117 may include an entry that includes information for tag frames to indicate which beacon frame (more specifically, its source) was used for a time reference for emitting the tag response frame. This information can then be used to perform the correct ToF analysis with the reference beacon device, being the starting point for a specific localizing procedure disclosed herein. (See also the illustration below the respective time lines, for example, in FIG. 8 for the master beacon frame providing the starting beacon transmission time point for a path time period, and in FIG. 12 for the repeater beacon providing the starting beacon transmission time point for a path time period, for example.) The physical layer payload PHY does not include a timestamp as discussed above to keep the total frame short. The physical layer payload PHY may consist of, for example, several ten symbols.

As pointed out above, the type of symbol, in particular the spreading code, may vary between the sections. Thus, durations TDframe of the frame format may be in the range as indicated above such as about 100 µs.

FIG. 3 illustrates an exemplary location rate frame format 121 consisting of multiple (time) slots 123 along a time line t. Exemplary slot durations may be in the range from 1 ms to 250 ms such as 3 ms or 8 ms. The location rate frame format 121 is configured to allow performing all processes required for localizing the involved tag devices. A first portion of the slots 12 3 is associated to a beacon section 125 and a second portion of the slots 123 is associated to a tag response section 127.

In the example of FIG. 3, the first twelve slots are associated with twin frames sent from a master beacon (e.g., slot 1 and slot 7) and five beacon repeater devices (e.g., slot 2 and slot 8, . . . ). In other words, each of the slots 1 to 12 includes time for beacon frames BF1A, BF2A, . . . BF1B, BF2B, . . . BF6B. In addition, each slot includes a guard time period 129 as a buffer window to clearly separate the beacon frames as indicated exemplarily for slot 7 and slot 8. Thus, the series of time slots within the beacon section 125 is formed of slots that are associated to interleaved pairs of beacon frames (see also corresponding shading of the beacon frames in FIG. 3).

As can be seen, slot 1 includes the initial one of all beacon frames (i.e., beacon frames BF1A) and slot 12 includes the closing one of all beacon frames (i.e., beacon frames BF6B).

For each pair, a first beacon frame and a second beacon frame can be separated in time. For example, slot 1 and slot 7 include the opening pair of beacon frames, while slot 6 and slot 12 include the closing pair of beacon frames. Between the slots 1 and 7 of the opening pair, all remaining first beacon frames are emitted. Between the slots 6 and 12 of the closing pair, all remaining second beacon frames are emitted. The order of the first and second beacon frames is selected such that time delays between the respective first and second frames of all pairs can be enforced to correspond to each other. For the herein disclosed concept, this common separation in time is referred to as a master time delay MTD. The master time delay MTD originally may be defined by the master beacon device but equally can be enforced to beacon repeater devices as disclosed herein (see dashed arrows indicating master time delay MTD of beacon repeater devices).

In the example of FIG. 3, a transition slot 13 following the beacon section 125 is provided as a transition period 131 to distinguish temporally the sections 125 and 127.

In the example of FIG. 3, eighteen slots 14-31 of the tag response section 127 are associated with tag response frames TF1, TF2, TF3 . . . TF18 sent from the tag devices to be located. Thus, beginning with a slot 14 up to slot 31, there are multiple but temporally separated slots in which tag response frames can be emitted. As each of slots 14 to 31 is associated to one of the tag devices to be located, reception of the tag response frame can similarly be associated to the tag device.

As can be seen already from the location rate frame format shown in FIG. 3, the localizing protocol implements a tag-specific emission time delay. Specifically, the tag-specific emission time delay results from different slots being associated to different tag devices. Thus, each tag device will wait for a specific time delay from receiving the twin beacon frames before emitting its tag response frame. In other words, the tag-specific emission time delays can be available to the components in form of tag-specific emission time delay data stored. The tag-specific emission time delay data are preset for the plurality of tag devices in a manner that the tag-specific emission time delays result in temporal displacements of the plurality of receptor response time points. Thus, receptor response time points can be associated to the tag devices by the tag-specific emission time delay data, such as identifying the respective slot. Accordingly, the frame format may not even need to include tag identification information. For example, tag-specific emission time delay data may be set such that the temporal displacement between receptor response time points related to different tag devices is in the range from 500 µs to several milliseconds such as at least 1 ms and up to 250 ms and more. (See also the description of the activities performed by the various components in connection with FIGS. 7 to 12.)

As for the slots of the beacon section 125, the slots 14 to 31 within the tag response section 127 may include guard time periods 129 as a buffer window to clearly separate the tag response frames and additionally to allow for a shift in time caused by their potential positions within a space available for localizing the same. Exemplarily, the guard time period 129 is schematically indicated for slot 15.

Similarly to transition slot 13, at the end of the tag response section 127, a transition slot 32 is provided as a transition period 131 to distinguish temporally the successive location frames. At least one of the transition slots 13 and 32 can be used for transmitting data from a control unit (server) to a component of the location system. For example, a random access channel can be provided to transmit data between a server and the master beacon device, the tag devices and/or the tag response receptor units. Moreover, device pairing and device registering can be performed in those free transition slots.

The temporal duration of the location rate frame 121 (referred to herein also as location rate period LRT) defines a respective location rate (LR). The location rate (LR) is the rate at which the localizing can be performed and at which localizing actions are repeated from the various components of the location system; e.g., the twin master beacons and the tag response frames are sent. The temporal duration of the location rate frame 121 defines the highest rate at which location processing can be performed. For example, the location rate frame 121, and thus the transmission of the two successive beacon frames, may be repeated at a location rate in the range from 1 ms to 250 ms if the location system is operated in a movement tracking mode, i.e., for tracking the movement of tag devices. If the location system is operated in a position monitoring mode, where movements of the tag devices are not expected at all or only at a very slow speed, the location rate frame 121, and thus the transmission of the two successive beacon frames, may be repeated at a rate in the range from at several seconds to days. The location rate frame 121 may be adapted depending on the number of tag devices to be tracked.

It is noted for FIGS. 1 to 3 that the give schematic content only indicates the structure of the location rate frame format; FIGS. 1 to 3 do not show, for example, a real temporal relative relationship beyond what is described herein. Specifically, the timing aspects may relate to the start frame delimiter SFD not shown explicitly in FIG. 3. It will be further understood that, while the pairs of beacon frames may have a common relative time delay, only the master beacons may have a preset position within the location rate frame 121. The beacons send from the repeater devices as well as the tag response frames may be shifted within the respective slots.

The implementation of the new UWB protocol in a location system, in particular the components of the location system are described in the following at first generally and then illustrated in connection with respective figures. As used anywhere in the present description, any feature described as a "unit" may be embodied, e.g., as discrete physical units, as conceptual functional units, e.g., of software code (an operating program) stored in a storage unit (memory), execute routines by a microprocessor, and/or within a hybrid hardware/firmware structure. For example, "units" disclosed herein are not particularly limited in the present teachings. Furthermore, two or more "units" may be integrated together into a single physical circuit structure (e.g. an integral unit or structure), such as a CPU that is controlled by different sets of programming code (stored instructions) capable of performing the particular functions when executed by a processor, such as a microprocessor or at least a programmable logic device (PLD).

Thus, the "units" referred to in particular the claims can be implemented as software, hardware, and/or a combination of both hardware and software. The specific details of the particular units are described throughout the specification, and more particularly in the exemplary sections, which provide sufficient information for a person of ordinary skill in the art to identify the corresponding structures, such as hardware circuits or software code segments. As another example, the "operation determining unit" disclosed herein may be embodied in the structure of a central processing unit (CPU) configured with instructions to perform the operations to derive position information from the provided points in time. The central processing unit may be part of local unit/device or a central server configuration. It may comprise one or more PLD such as microprocessors in communication with one or more memories. The memory may store one or more microprocessor-readable instructions (programs) that, when executed by the PLD or microprocessor, perform, for example, the triangulation calculations. Moreover, devices such as the tag device, the master beacon device, or repeater devices may comprise various units that interact with each other to perform the desired actions such as receiving and/or transmitting UWB signals, identifying timing features of the UWB frames, performing clock calibration, etc.

Real-time location system (RTLS)

The RTLSs disclosed herein comprise components required to perform actions in line with the UWB localizing protocol. In particular, a location system may include components (such as structural units, devices, systems) that emit and/or receive UWB signals and/or that perform a distance determination. The components to emit and/or receive UWB pulses can be provided in (mobile) tag devices to be located, stationary devices such as a master beacon device and beacon repeater devices, as well as tag response receptor units.

The stationary devices may emit, receive, or both, i.e., emit and receive (as integrated devices). Furthermore, during a localizing action non-moved tag devices may be used as at least temporarily stationary devices acting as tag response receptor units or beacon repeater devices. It is noted that completely stationary devices (fixedly installed transceivers) often are referred to as anchors or satellites. Those devices are, for example, fixedly mounted to a wall or ceiling or other types of installations being stationary with respect to a to be localized area (e.g. the wall of a hall or a container).

A component that performs the distance determination may be part of a control system. Alternatively or additionally, it may be distributed to some extent; for example, at the master beacon device or the tag response receptor units a portion of calculations may be done locally. Generally, those components may, however, also provide all measured data (time of arrivals) to the control system. The control system may be a central server unit that has respective computing power to perform the calculations in real time for many tags as well as data memory for being able to consider other data such as position data of the master beacon device and the tag response receptor units and optionally the repeater devices.

Master Beacon Device

The master beacon device is usually a stationary unit. The master beacon device, specifically the master beacons ensures that the location frame is essentially temporally aligned for all participating components. Moreover, the master beacon device provides a calibration of other components of the location system by, for example, the master beacons being emitted with a preset master beacon time delay. Moreover, the master beacon device may participate at a (master) ToF measurement.

The master beacon device includes a beacon transmission unit, a master clock defining a master time, and a local memory (herein also referred to as the master storage unit). A microprocessor or at least a PLD may be provided to interact with these components, e.g., initiate the UWB transmission controlled by the master clock and receive or store date at the local memory. Some or all of these elements may be part of a UWB chip. The UWB chip may comprise, for example, a power voltage controlled oscillator (VCO) and/or a 26 MHz (or 52 MHz) voltage controlled and temperature compensated crystal oscillator (VcTcXO) as the master clock.

The beacon transmission unit is configured to emit UWB pulses. The beacon transmission unit may comprise a transmission (Tx) antenna. Using the master clock, the beacon transmission unit is configured to transmit the twin beacon frames at very accurately timed emission time points. For example, the accuracy may be given by emission at 125 ps steps.

(Mobile) Tag Devices

A tag device is a unit that is to be located within a location area of the location system. Preferably the tag device is a mobile unit, which means that it is not permanently at the same place, which makes it interesting to localize the same. It may be moved by being attached to or being part of a moving object. The tag device participates at a UWB signal exchange with the master beacon device and tag response receptor units.

The tag device may include a (beacon) reception unit, a tag response emission unit, a tag clock, and a calibration and calculation unit. The tag clock may be realized as a clock-pulse-generator or a clock-wave-generator. The tag clock defines a tag time for each tag. As for the master beacon device, some or all of these elements may be part of a UWB chip. The tag device can receive UWB pulses, specifically the master (or repeater) beacon frames, with the reception unit. The reception unit may comprise a reception (Rx) antenna. The tag device is further configured to transmit a tag response. The tag response may be a (single) tag response frame that is emitted with a tag-specific emission time delay after the tag device has received the beacon frames. The tag response emission unit can include a UWB transmission unit such as the beacon transmission unit. The UWB transmission unit may use the Rx antenna for emission or comprise a separate Tx antenna.

Using the tag clock, the reception unit and the transmission unit are configured to receive the beacon frames and emit the tag response frames at a very accurately timed emission time point. For example, reception and transmission at the tag device may be performed at 125 ps steps. The tag clock is calibrated by the calibration and calculation unit using the master time delay.

With respect to the emission, the UWB chip can, for example, be set up similar to the UWB chip of the master beacon device (accurate timing of emission at, for example, 125 ps steps).

The tags may be formed and/or used as the tags or mobile (transmitting-receiving) units described in one or more of the following patent applications: Patent Application Publication No. WO 2018/073421 A3, Patent Application Publication No. WO 2019/052742 A1, Patent Application Publication No. WO 2019/048149 A1, Patent Application Publication No. [[Wo]]WO 2019/048153 A1, Patent Application Publication No. WO 2019/048152 A1, Patent Application Publication No. WO 2018/073422 A3, Patent Application Publication No. WO 2019/048151 A1, as well as the not yet published German patent applications Patent Application Publication No. DE 102018110145.7, Patent Application Publication No. DE 102018110150.3, Patent Application Publication No. DE 102018110074.4. These applications are incorporated herein by reference in their entirety. One of the advantages to incorporate the herein described UWB location system and/or method into the industrial manufacturing, production control, or fabrication systems, and/or methods (as described in the above applications often as "interior tracking or location system") is the possibility for the fabrication entities or industrial manufacturing plants to change their procedures and equipment not in one step from manually or paper-based fabrication procedures to a completely automatic and digitalized procedure, but to have instead a possibility to change these procedures step by step. With the connection of a mobile UWB-tag to a working order or a workpiece, it is extremely easier to find such an order or piece in the working area of a fabrication entity or industrial manufacturing plant.

A tag may be placed in a housing, which may also encompass other functionalities such as a smartphone, a computer, a control system of an automated guided vehicle etc., for example.

Reception Units

A reception unit is generally configured for receiving UWB signals and derive respective timing information for the UWB frames, e.g., from the start frame delimiter SFD. The reception unit, accordingly, can be provided in the tag devices, the tag response receptor units, beacon repeater devices, and optionally the master beacon device. The reception unit may comprise its own Rx antenna that receives UWB frames at very accurately measured time points. For example, it allows measuring tag beacon time points for the arrival time of the (twin) beacon frames at a tag or receptor beacon time points for the arrival time of the (twin) beacon frames at a tag response receptor units. As said, Rx antenna and Tx antenna may be combined within the tag devices, the master beacon device as well as the beacon repeater devices. For exemplary approaches to measure the same, it is referred to the above mentioned patent applications.

A reception unit can further be configured to select a pair of beacon frames of the master beacon device or optionally of one of the beacon repeater devices for calibration and a beacon frame of the master beacon device (MB) or optionally of one of the beacon repeater devices (BR) as reference beacon frame.

Calibration and Calculation Units

A calibration and calculation unit is generally configured to perform a calibration of clock. In the herein disclosed concepts, the calibration of a local clock may be performed with the master (or repeater) beacon frames and the master time delay. Calibration and calculation units are provided in the tag devices, the tag response receptor units, and the beacon repeater devices. The calibration ensures that, at least temporally, the clocks of all participating components are synchronized (aligned) in particular to the master time or master clock, respectively.

The calibration and calculation unit is configured to receive and/or derive timing information from those beacon frames (usually a pair) that may be selected for the calibration by the reception unit. The timing information can be used to, based on the (twin) beacon frames, synchronize a tag clock, a receptor clock, or a repeater clock with the master clock. The calibration in particular compensates frequency drifts between the master clock and any clock to be calibrated.

Specifically, for the tag devices, the calibration allows realizing a tag-specific emission time delay with a correctly calibrated tag clock.

Tag Response Receptor Units

A tag response receptor unit is a usually stationary (or at least temporarily stationary) unit that is configured for a measurement of arrival times of tag response frames.

The tag response receptor unit may include a reception unit and a receptor clock. As for the master beacon device, some or all of these elements may be part of a UWB chip.

The reception unit is operated to receive the tag response frames and, involving the receptor clock, to associate respective receptor response time points to each tag response frame.

As the tag response receptor unit is configured to derive time of arrival information for each tag response frame, time calibration is performed as for the tag device with the master beacon frames and the master time delay. Therefore, the reception unit that is further operated to receive the master beacon frames.

The tag response receptor unit may provide said time of arrival information to a distance determination unit to perform the localization analysis. For that purpose, the tag response receptor unit may further comprise data exchange devices such as LAN or WLAN communication units providing a data communication channel to the distance determination unit or generally a control system.

With the above components of a location system (master beacon device and optionally beacon repeater devices, (mobile) tag devices, and tag response receptor units), a localizing procedure can be implemented for the above summarized UWB protocol. Specifically, the master beacon device and the tag devices are configured to receive and transmit sequences of UWB signals that have a common underlying frame format.

Reception time points of the UWB frames are measured at the components of the location system. A high precision measurement of a reception time point is done using a commonly defined section of the UWB frame format (usually the start frame delimiter SFD). The reception time points are then associated to the UWB frames.

Reception time points associated to beacon frames are used to perform time calibration of the various components. Specifically, a preset time delay of the master beacon pair is known to the components to be calibrated; i.e., the time between the arrival of beacon frames at the tag device or the tag response receptor unit (which also receive the beacon frames) is calibrated to correspond to a preset and known master time delay.

The reception time points of the tag response frames can then be used to determine a distance of the respective tag device from tag response receptor units. This can be based on trilateration analysis. For example, determining one of the distances can be based on the ToF measurement for the master beacon device (or beacon repeater devices), where the master beacon device transmits the beacon frames and also receives the tag response frame, resulting in a master time-of-flight period representing the path from the master beacon device to the tag device.

When the tag response frame is received at any other tag response receptor unit than one at the master beacon device or the beacon repeater devices, determining the distance from the tag device to the respective tag response receptor unit can be based on a TDoA measurement. That TDoA measurement may be corrected by the master ToF duration (period), related to the signal path from the master beacon device to the tag device or a (repeater) ToF duration (period), related to the signal path from the repeater device to the tag device. The correction ca be implemented in an enhanced algorithm that is able to use one Time of Flight (measured between e.g. the master beacon and the tag) and then reconstruct the (receptor) time-of-flight periods from the tag device to all the other receptor units. This results in a location analysis that may have to some extent the quality of three-way ranging, at a fraction of the cost in terms of number of required transmissions. Moreover, time measurements/time points may be corrected with respect to each other as the distance between the master beacon device (or the beacon repeater device) to each of the tag response receptor unit is known. The above indicated corrected TDoA measurements can be understood as indirect ToF measurements using those corrected TDoA time points.

Specifically, the location system has information on the positions of the master beacon device, the beacon repeater device(s), and the tag response receptor units. This is used for the TDoA analysis e.g. when the distance between master beacon, the beacon repeaters, and the tag response receptor units are used to correct any relative time shifts. Moreover, the positions are used to derive the position of the tag as identified distances between the tag response receptor units begin at those known positions.

For example, it will be understood that a plurality of those corrected TDoA measurements will transform into circles around the positions of the tag response receptor units in the underlying Cartesian coordinates, whereby the circles that intersect at the position of the tag to be localized. This analysis stands in contrast to an analysis based on deriving parabolas/hyperbolas from conventional TDoA measurements extending with respect to those positions of the tag response receptor units.

In the following, a location system and the contributing components are described in connection with FIGS. 4 to 6. Moreover, the exchange of UWB signals between the contributing components is described in connection with FIGS. 6 to 12.

Figure 4:
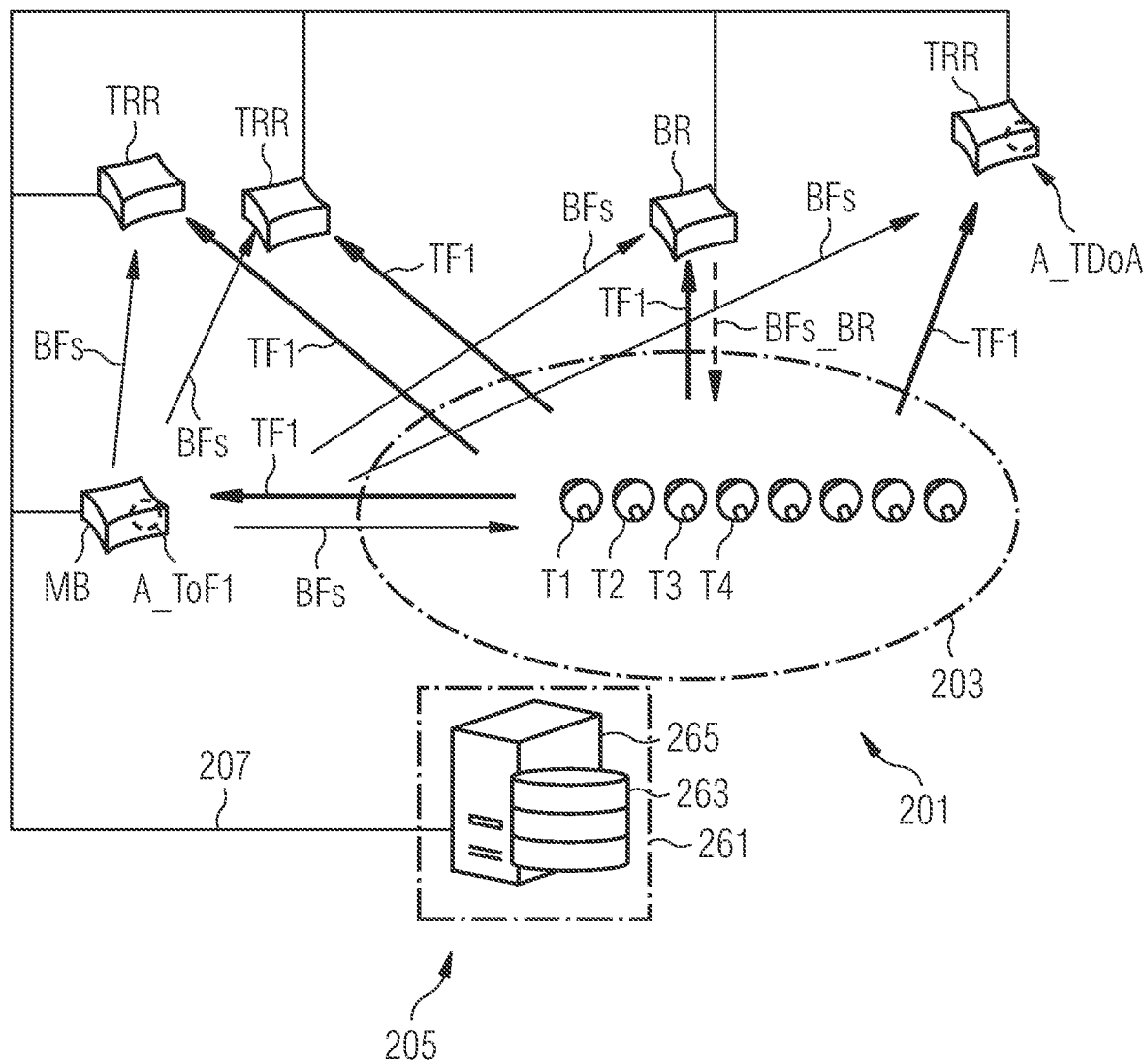
FIG. 4 shows a schematic illustration of a location system that includes a master beacon device, several mobile tag devices, several tag response receptors, and a beacon repeater device.

In FIG. 4, various components of a location system 201 are shown schematically such as a master beacon device MB, several mobile tag devices T1, T2, . . . , several tag response receptors TRR, and exemplarily a beacon repeater device BR. In the exemplary embodiment, the master beacon device MB and the beacon repeater device BR also each include a tag response receptor unit, thereby having also the functionality of a tag response receptor TRR. It is noted that usually more than one beacon repeater device BR are installed in a location system 201, also in FIG. 4 is for clarity reasons only one beacon repeater device BR shown.

The location system 201 is configured to (continuously and in real time) determine the positions of tag devices T1, T2, . . . within space, specifically within a location area 203 by exchanging UWB signals. In the present field of localizing, real time means that position information is available fast enough compared to the speed of movement of a tag device such that the movement can temporally be resolved to a sufficient degree. The location area 203 is defined by the coverage of the UWB signal exchange between the various components.

In the exemplary embodiment of FIG. 4, the location system 201 further includes a control unit 205 that is connected for data exchange with the master beacon device MB, the tag response receptors TRR, and the beacon repeater device BR. The data connections may be based on cables 207 or may be wireless. Thus, the components may be part of a LAN and/or WLAN network or other communication network(s).

In addition, the UWB signal exchange is schematically illustrated in FIG. 4. From the master beacon device MB beacon frames BFs are sent out to the tag devices T1, T2, . . . within the location area 203, the tag response receptors TRR, and the beacon repeater device(s) BR. The beacon frames can be used for clock calibration by those devices being able to derive timing information for the beacon frames BFs. In addition, those tag devices T1, T2, . . . , which are operated in a changing position mode for being localized, can emit tag response frames with a tag specific time delay in line with the location protocol. Exemplarily, the emission of a tag response frame TF1 from the tag device T1 is indicated in FIG. 4.

The tag response receptors TRR will receive the tag response frame TF1 and derive a specific time of arrival (ToA) for the tag device T1 for the tag response frame TF1. In combination with the emission time of the beacon frames BFs from the master beacon device MB or a beacon repeater device BR, a time difference-of-arrival analysis A_TDoA can be performed by the respective tag response receptor TRR. Alternatively or in addition, the timing information can be forwarded to the control system 205 via the network connections for conducting a comprehensive localizing analysis based on all available timing information.

Also the master beacon device MB will receive the tag response frame TF1 and derive a specific time of arrival for the tag device T1 for the tag response frame TF1. However, based on two way ranging, a time-of-flight analysis A_ToF1 between the master beacon device MB and the tag device T1 can be easily determined. The time-of-flight analysis A_ToF1 may be performed by the master beacon device MB. Alternatively or in addition, the timing information can be forwarded to the control system 205 via the network connections for conducting the comprehensive localizing analysis based on all available timing information.

It is noted that the time difference-of-arrival analysis A_TDoA for the tag response receptors TRR can be simplified by using the time-of-flight analysis A_ToF1 for the master beacon device MB. Such an analysis of corrected time difference-of-arrival measurements can be performed, for example, within the control unit 205.

Furthermore, FIG. 4 indicates the concept of using the beacon repeater device BR to extend the range of the location system 201 and/or improve the signal processing. For that purpose, the beacon repeater device BR emits repeater beacon frames BFs_BR that cover the same or a different area. Thereby, there may be a signal strength of the repeater beacon frames BFs_BR at one of the tag devices that is higher than the signal strength of the beacon frames BFs of the master beacon device MB.

The tag devices T1, T2, . . . may than decide to use the repeater beacon frames BFs_BR to calibrate its clock and independently the tag devices T1, T2, . . . to use the repeater beacon frames BFs_BR also to calculate the tag-specific emission time delay. It is noted that the tag device emits its tag response frame with the correct timing in order to send it in its corresponding time slot. It is further noted, that the tag response frame can incorporate an identifier (ID) of the beacon repeater device BR from which the tag repeater beacon frames BFs_BR were used to calculate the tag-specific emission time delay.

Furthermore, FIG. 4 indicates the concept of setting up an ultra-wideband network synchronized in timing based on the master beacon device MB and one or more beacon repeater devices BR. In the case that a tag device is configured to have sufficient computing power required for performing analysis and calculation of reception time points of master and repeater frames (and provided that the tag device knows the exact location of each beacon transmitter such as the master beacon and the repeater beacons), the tag—when receiving beacon frames sent at time slots of the beacon section—may determine distance information for the distances between the tag device to the master beacon device and the plurality of beacon repeater devices based on relative position information of the master beacon device and the plurality of beacon repeater device as disclosed in more detail in connection with FIGS. 16 to 17C.

Figure 5:
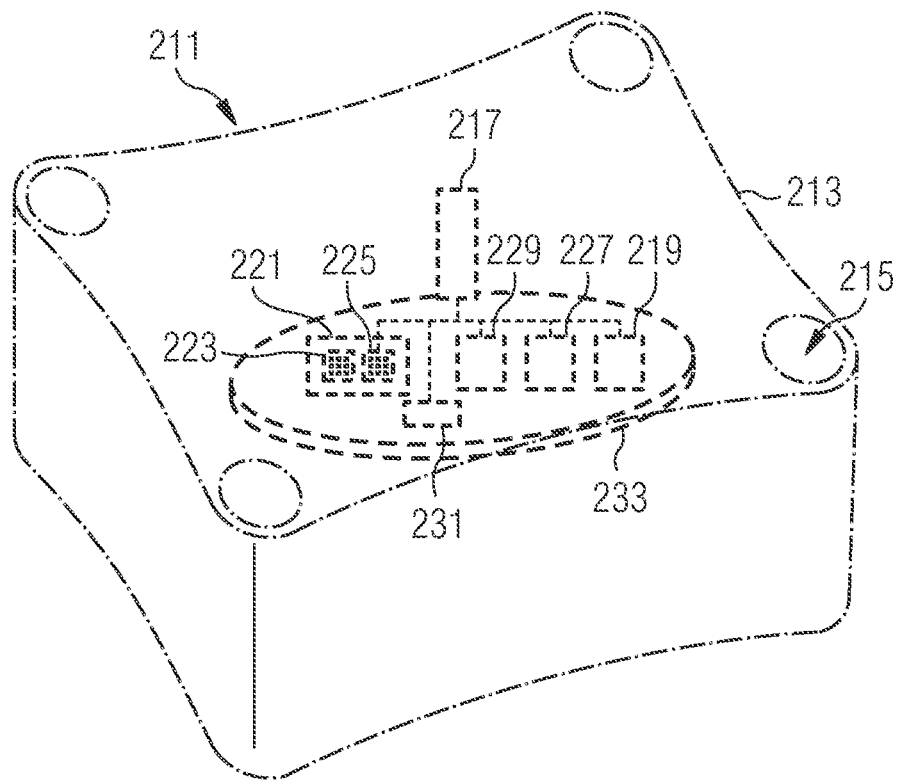
FIG. 5 shows a schematic illustration of a stationary anchor such as a master beacon device or a beacon repeater device.

FIG. 5 illustrates schematically an exemplary stationary anchor 211 such as a master beacon device MB or a beacon repeater device BR. The anchor with a similar set up can be configured as a tag response receptor TRR shown in FIG. 4. The anchor 211 comprises a housing 213 with several through holes 215 for fastening screws to attach the anchor stationary to a wall or ceiling.

Within the housing 213, the anchor 211 includes a beacon transmission unit 217 that is configured to perform, e.g., a (double) transmission of two successive beacon frames. Specifically, the beacon transmission unit 217 is configured to transmit the two successive beacon frames with a master time delay MTD. Thus, the two successive beacon frames are emitted at a first beacon transmission time point and a second beacon transmission time point. The double transmission is thus performed with a master time delay MTD between the beacon frames.

The anchor 211 further includes a master (repeater) clock 219 defining a master (repeater) time, and a master (repeater) storage unit 221 having stored therein a master time delay data 223, and optionally for the beacon repeater device BR a repeater time delay data 225.

The master time delay corresponds to the master time delay data 223 that defines the slots within the location rate frame format associated to the two successive beacon frames. The beacon time delay data 225 defines the slot within the location rate frame format associated to the respective beacon repeater device. It is noted that while the transmission of the pair of beacons can be considered successive in the perspective of the master beacon device or the beacon repeater device, in the perspective of the location rate frame format there may be additional slots for frames to be transmitted between the pair of beacons transmitted from the master beacon device, for example.

The anchor 211 may be configured as an integrated unit that also includes a tag response receptor unit 227. Alternatively, an anchor may only be configured as a tag response receptor TRR and thus include essentially only a tag response receptor unit 227, but does not include the components for beacon transmission.

The skilled person will respectively associate from the components schematically shown in FIG. 5 those components that are relevant for a master beacon device MB, a beacon repeater device BR and a tag response receptor TRR (shown in FIG. 4), respectively.

For a tag response receptor TRR, a tag response receptor unit 227 may include a receptor clock defining a respective receptor time (in an integrated unit, the master (repeater) clock 219 can function as the receptor clock). For example, the tag response receptor unit 227 is configured to receive the tag response frame TF1 sent from the tag device T1. (see FIG. 4). A respectively measured receptor response time point is specific for the respective tag response receptor unit 227 and the respective tag device due to the tag-specific emission time delay.

To ensure temporal synchronization, anchors 211 operated as beacon repeater devices or tag response receptor units may further include a calibration and calculation unit 229. As UWB frame receivers, the tag response receptor unit 227 may also receive the beacon frames. The UWB frame receivers (e.g., the rag response receptor units 227 or the respective receivers in the beacon repeater devices) may be configured to be able to select those beacon frames to be used for the calibration from all received beacon frames (sent from the master beacon device or the repeater beacon devices). E. g., the UWB frame receivers may be configured to evaluate the signal strength and/or signal quality for all received beacon frames to identify the most suited pair of beacon frames for calibration. The UWB frame receivers may further be configured to provide the respective determined time points (received at the tag response receptor or beacon repeater device) to the calibration and calculation unit 229.

The calibration and calculation unit 229 is configured to calibrate the repeater/receptor time with respect to the master time by comparing reception time delay data derived from respective (receptor response) time points of detected beacon frames with the master time delay data 223.

The reception time delay data, the master time delay data, and or the beacon time delay data 219 may be stored in local memories (e.g., the repeater, receptor or master storage units 221).

As indicated above, the anchor 211 may comprise optionally a local distance determination unit 231 that is configured to at least partly perform steps of the location analysis.

The above components (schematically shown in FIG. 5) may be integrated at least partly within a common UWB chip and/or may be mounted to a base plate or substrate 233.

Figure 6:
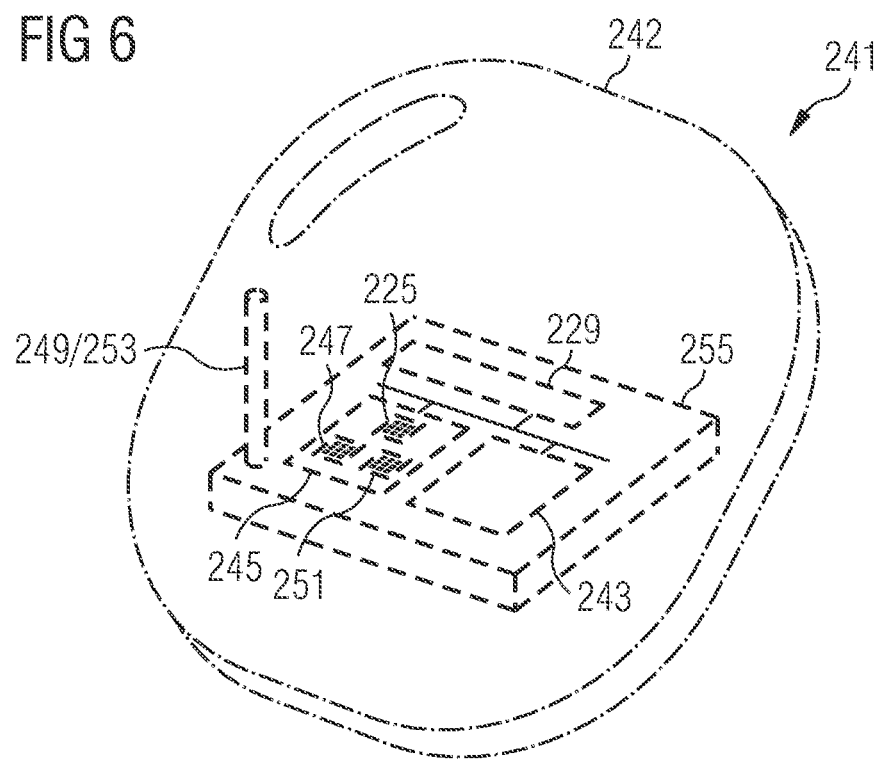
FIG. 6 shows a schematic illustration of a mobile tag device.

FIG. 6 illustrates schematically a mobile tag device 241. The tag device may comprise a housing 242 with an opening, for example, for attaching to some to be located object.

The tag device 241 includes a tag clock 243 defining a tag time that is specific for the respective tag device 241. The tag device 241 further includes a tag data storage unit 245 having stored therein the master time delay data 223 and a tag-specific emission time delay data 247. The tag-specific emission time delay data 247 is specifically associated to the respective tag device 241 and may define the slot within the location rate frame format associated to the respective tag device 241. The tag-specific emission time delay data 247 is further associated to the receiving of the two successive beacon frames.

The tag device 241 further includes a reception unit 249 and a calibration and calculation unit 229. The reception unit 249 is configured as a UWB frame receivers to receive the beacon frames sent from the master beacon device or a beacon repeater device, thereby measuring respective tag beacon time points, and generate a tag-specific reception time delay data 251 from the tag beacon time points. As disclosed in further detail below, the reception unit 249 may be configured to be able to select those beacon frames to be used for the calibration from all the received beacon frames (sent from the master beacon device or the repeater beacon devices). E. g., the reception unit 249 may be configured to evaluate the signal strength and/or quality for all received beacon frames to identify the most suited pair of beacon frames for calibration. The reception unit 249 may further be configured to provide the respective determined time points (received at the tag response receptor or beacon repeater device) to the calibration and calculation unit 229.

The calibration and calculation unit 229 is (similar to the above described calibration and calculation unit of the repeater devices or the tag response receptors) configured to calibrate the tag clock with respect to the master time by comparing the tag-specific reception time delay data 251 and the master time delay data 223.

The tag device 241 further includes a tag response emission unit 253 configured to derive a tag-specific emission time delay from the tag-specific emission time delay data 247 for the calibrated tag time. As disclosed in further detail below, the tag-specific emission time delay may be derived for a time point associated with a reference beacon frame. Accordingly, the reception unit 249 and/or the tag response emission unit 253 may be configured to select a reference frame from all the received beacon frames (sent from the master beacon device or the repeater beacon devices). E. g., the reception unit 249 and/or the tag response emission unit 253 may be configured to evaluate the signal strength and/or quality for all received beacon frames to identify the most suited beacon frame for setting a time point for applying the tag-specific emission time delay.

For example, a beacon frame may be selected that is also used for the calibration. However, as the calibration may not need to be done for every location rate frame, a beacon frame may also only be selected for the emission of the tag response frame.

The tag response emission unit 253 may further be configured to calculate from the tag-specific emission time delay data the tag-specific emission time delay to be used for that set time point. For example, the tag-specific emission time delay data may be stored in the tag data storage unit 245 with reference to a master beacon frame (e.g., the second master beacon frame). If, for example, the time point for applying the tag-specific emission time delay is set to one of the repeater beacon frames as reference frame, the tag response emission unit 253 is configured to calculate the tag-specific emission time delay from the tag-specific emission time delay data under consideration of the difference in time of the slots associated with the master beacon frame and the respective repeater beacon frame.

Using the derived tag-specific emission time delay, the tag device 241 emits a tag response frame (usually one per location rate frame) after waiting for the tag-specific emission time delay upon the time point associated with the reference beacon frame such as one of the tag beacon time points.

The tag response emission unit 253 may further be configured to enter in the UWB frame sent as tag response frame, the information which reference beacon device was used for the (reference) time point associated with the receiving of the (reference) beacon frame BF, usually the master beacon device ID or the beacon repeater device ID.

The letter information on the ID enables in particular a re-construction of a path time period lapsed between a time point associated with the transmitting of the reference beacon frame and a receptor response time point for the arrival time of the tag response frame at the tag response receptor unit receiving the tag response frame. Accordingly, the UWB frame receivers (e.g., the rag response receptor units 227 or the respective receivers in the beacon repeater devices) can be configured to read that information on the ID relating to the source of the reference beacon frame and to provide the same to the control unit 205.

The above components of a tag device (schematically shown in FIG. 6) may be integrated at least partly within a common UWB chip and/or may be mounted to a base plate or substrate 255.

With respect to the location analysis, it is referred again to FIG. 4. The control unit 205 may comprise a distance determination unit 261.

The distance determination unit 261 may thus be configured as a centralized distance determination unit that includes a data storage unit 263 and a calculation unit 265. The data storage unit 263 stores the master time delay data 223, and the tag-specific emission time delay data 247 specifically for each tag device. Optionally, the data storage unit 263 may further store installation position data representing the positions of and optionally also the distances between each of the plurality of tag response receptor units and the beacon transmission unit of the master beacon device and/or the beacon repeater devices.

Once measured/determined by the receptor units or by the control unit, the data storage unit 261 may further receive from the receptor units, master beacon device, repeater devices timing information such as tag/receptor beacon time points, receptor response time points, time durations such as data values of the accumulated time-of-flight periods or time difference-of-arrival periods, and at least temporarily store the same during the calculation.

The calculation unit 265 is configured to determine, for a selected tag device, the path time periods lapsed between, for example, the second beacon transmission time point and the receptor response time points for the arrival times of the tag response frames. From the determined path time periods the tag-specific emission time delays of the respective tag devices can be subtracted to derive accumulated time-of-flight periods that are respectively associated to transmission paths from the master beacon device to the response receptor units via the respective tag devices. Based on the accumulated time-of-flight periods, the calculation unit 265 is configured to determine distance values associated to positions of the tag devices T1, T2, . . . and optionally the respective installation distance data. The respective installation position data relate to the components involved in the respective transmission path.

In connection with FIGS. 7 to 12, various actions during the UWB exchange as performed by the components of the location system described in connection with FIG. 4 are illustrated. The illustration is based on the location rate frame format shown in FIG. 3 and the respective times of the components. It is noted that the time lines in FIGS. 7 to 12 are synchronized with respect to the master time but may be shifted in time due to the distance between transmission and reception positions, i.e., due to the travelling time of the signals. With the knowledge of the positions (position information), however, the shift in time is known within the localizing system and can be included in an analysis at various points such as when performing the localizing calculation or when determining the TDoA at respective tag response receptor units.

For simplicity of the drawings, the beginning of the time slots in the figures is shown for each master/repeater beacon MB, BR to coincide with the master beacon frame. The skilled person will understand that also relative time shifts are given for the different repeater beacon frames and can be included in the localizing analysis. In this context, it is referred to the reception of the tag response frames in FIGS. 9 and 11, which are shifted with respect to the beginning of the time slot in a tag specific and tag response receptor unit specific manner. The differing time shift originates from the underlying paths via the tag devices to the respective tag response reception units.

Referring to FIG. 7, the actions performed by the master beacon device MB include the emission of twin master beacon frames BF1A, BF1B. The twin master beacon frames BF1A, BF1B are transmitted at time slot 1 and time slot 7 defined for a master time t_MB given by the master clock. The twin master beacon frames BF1A, BF1B represent two successive beacon frames that are emitted at a first beacon transmission time point ToT1 and a second beacon transmission time point ToT2. The twin master beacon frames BF1A, BF1B are separated in time by the master time delay MTD. The master time delay MTD is provided to the various components and is stored as master time delay data 223 in respective memories.

In FIG. 7, the transmission time points are exemplarily indicated at the beginning of the master beacon frames BF1A, BF1B. Transmission time points are generally linked to a specific timing feature of the frame format, e.g., the start frame delimiter SFD indicated in FIG. 2.

In the time period shown in FIG. 7, no reception of tag response frames takes place by the master beacon device MB, e.g. because there is no tag device operated in the changing position mode within the location area 203 of the location system 210. The transmission of the twin master beacons BF1A, BF1B is repeated with the location rate (LR). In particular if additional beacon repeaters are operated, the master beacon frames BF1A and/or BF1B, especially a payload of BF1A and/or BF1B, can include data about the ID of the master beacon device MB.

FIG. 8 illustrates the time line of the tag time t_T2 of the tag device T2, i.e., the tag device associated with slot 15. As indicated above the time line, the tag device T2 receives the twin master beacons BF1A, BF1B within the time slots 1 and 7. It derives tag beacon time points ToA1_T and ToA2_T that indicate the measurement of the arrival of the twin master beacons BF1A, BF1B. Based thereon, the tag device T2 can derive the master time delay MTD and calibrate the tag clock, i.e., the tag time t_T2 is calibrated with respect to the master time t_MB. To calibrate the tag clock 243, the time difference between the tag beacon time points ToA1_T and ToA2_T (as measured with the tag time) is adapted to the master time delay MTD as stored in the tag data storage unit 245. Based on the calibrated tag time, a tag response frame TF2 is emitted during time slot 15 at a tag-specific time of transmission ToTTF2. A tag specific time delay TSTD_TF2 is enforced between the tag response frame and the tag beacon time points. The transmission of the tag response frame TF2 can be repeated with the location rate (LR) or with a reduced rate (every second or third . . . location frame).

As indicated in the exemplary embodiment shown in FIG. 8 below the time line, the tag-specific emission time delay TSTD_TF2 is associated with the second one of two successive beacon frames BF. Specifically, the tag-specific emission time delay TSTD_TF2 begins at the second tag beacon time point ToA2_T. However, a tag-specific emission time delay may similarly be set such that it starts at the first tag beacon time point ToA1_T or is any time point defined with respect to the receiving of the two successive beacon frames BFs at the tag.

Referring to FIG. 9, the actions performed by a tag response receptor TRR include the reception of twin master beacon frames BF1A, BF1B at respective receptor beacon time points ToA1_R, ToA2_R and the respective calibration of the receptor clock (shown above a time line of a receptor time t_TRR. For example and as for the tag devices, receptor beacon time points ToA1_R, ToA2_R are determined for the received beacon frames BFs; for those receptor beacon time points ToA1_R, ToA2_R, a receptor-specific time delay data is generated and compared with the master time delay data 223. Based on the comparison, the receptor clock can be set to ensure a calibrated receptor time t_TRR.

Based on the corrected receptor time t_TRR, the tag response reception unit will further receive the tag response frame TF2 during time slot 15 at a receptor response time point ToATF2_R. However, due to the time of flights from master beacon device to the tag device T2 and from the tag device T2 to the tag response receptor TRR, there is some additional time passed and, for example, the measured time point of reception is delayed by a time period X2 with respect to the end of the tag specific time delay TSTD_TF2 of tag device T2 (as shown below the time line of time t_TRR).

It is noted that there is also a delay between the reception time points of the twin master beacon frames BF1A, BF1B with respect to the transmission time points due to the distance between the master beacon device MB and the tag response receptor TRR. However, that distance is known from the installation position data that includes for each of the tag response receptors TRR and the master beacon device MB the position in space. Thus, the location system knows the positions relative to each other and accordingly also the distances, which can be included in the analysis.

As not only one tag device can be located within one location frame, there is exemplarily also indicated the tag response frame TF18 received during time slot 31 for tag device 18 at a receptor response time point ToATF18_R. The receptor response time point ToATF18_R is subject to the tag specific time delay TSTD_TF18 of tag device T18 and the respective distance between the tag device T18 and the tag response receptor TRR.

From time periods X2 and X18, the time differences of arrival TDoA for the tag devices T2 and T18 can be respectively derived. Using multiple tag response receptors and optionally the master beacon device as a response receptor (see also FIG. 10), the location of the tag devices within the location area can be calculated.

FIG. 10 illustrates the special situation for a master beacon device (or similarly a repeater device) acting as a reference transmitter of the twin beacon frames and receptor of the tag response frame T2. This corresponds to a delayed time-of-flight measurement such that the distance between the tag device T2 and the master beacon device as well as the master time-of-flight ToF1 between the same can easily be derived and included in the analysis of the timing information received from the tag response receptors.

Figure 11:
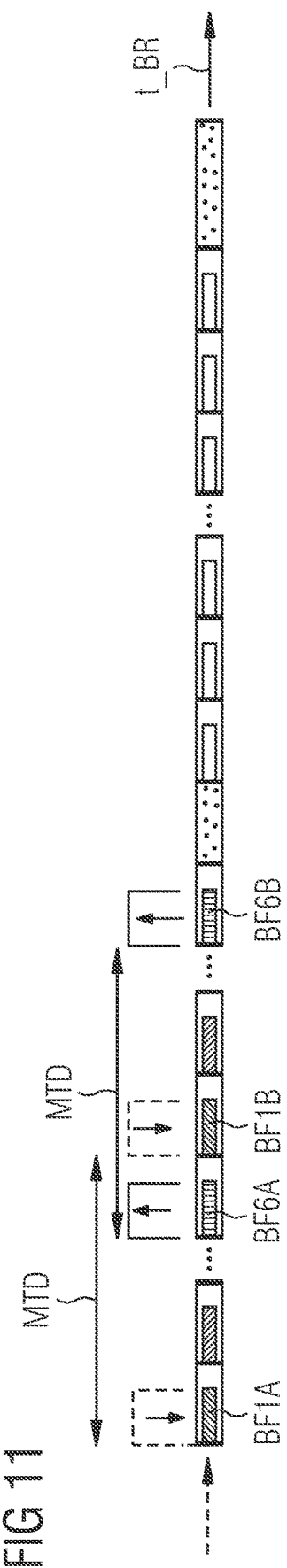

FIG. 11 illustrates the situation for a beacon repeater device BR that is used to extend the range or improve the quality and/or signal strength of provided twin beacon signals (no tag response frames are shown in FIG. 11). In view of the continuously repeated reception of twin master beacon frames BF1A, BF1B (with the location rate), the beacon repeater device BR can calibrate a repeater time t_BR to the master time and, thus, replicate the master beacons by emitting repeater frames BF6A and BF6B with the master time delay MTD. However, the repeater frames BF6A and BF6B are shifted to slots 7 and 12 and are emitted with respect to the calibrated repeater time t_BR. The repeater frames BF6A and/or BF6B, especially a payload of BF6A and/or BF6B, can include data about the ID of the emitting beacon repeater device BR. All installed beacon repeater devices BR can do so.

Figure 12:
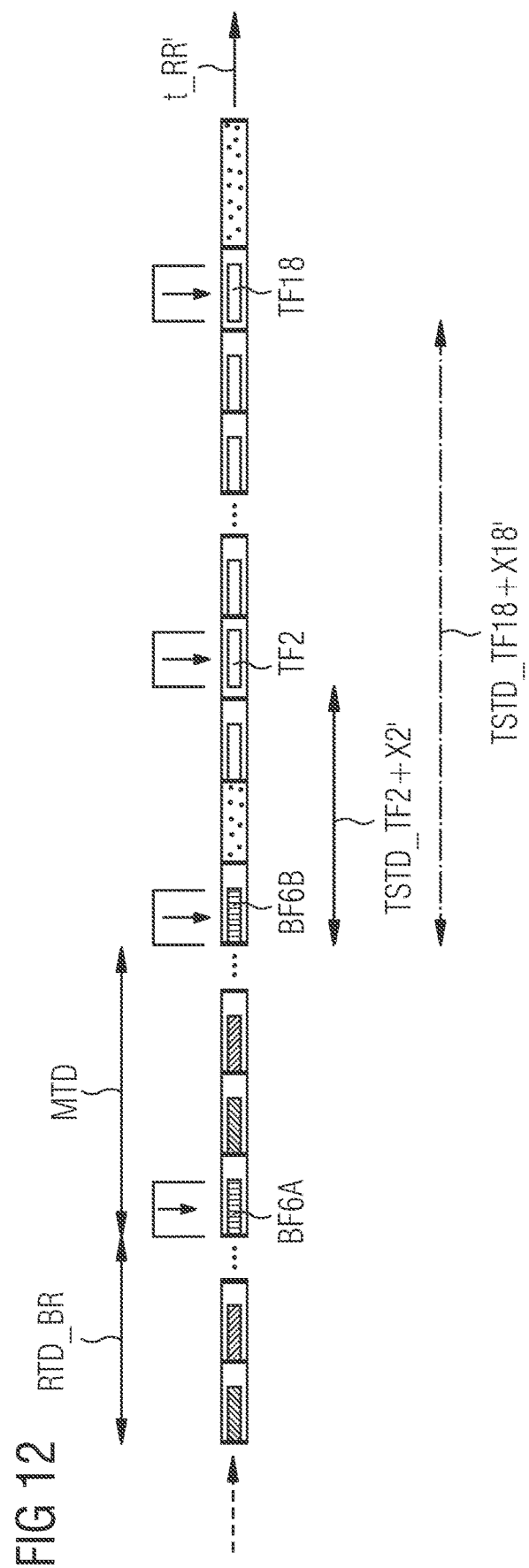

As shown in FIG. 12 above a time line of a receptor time t_TRR', a tag response receptor TRR may calibrate itself using the repeater frames BF6A and BF6B of FIG. 11 that are separated by the master time delay MTD, assuming a calibrated beacon repeater device associated with the repeater frames BF6A and BF6B. The reception of the repeater frame BF6A and the reception of the repeater frame BF6B are temporally displaced with respect to the master beacon frames by the repeater time delay RTD_BR that is assigned to the beacon repeater device BR. Specifically, the repeater frames BF6A and BF6B are received within time slots 7 and 12 of the location frame. As the calibration of the receptor clock uses the repeater time (that may be shifted with respect to the master time), FIG. 12 indicates a modified receptor time t_TRR'.

In general, the synchronization (time calibration) may be performed with those pairs of beacon frames having a required or preferred signal quality; i.e., the tag response receptor TRR selects the beacon frame emitters that it prefers to use for synchronization. It is noted that the localization procedure (illustrated in FIG. 12 below the time line of the receptor time t_TRR' in FIG. 12) uses also on the repeater frame BF6B. However, the localization procedure is separate from the synchronization procedure and, thus, does not require the synchronization being performed with the repeater frames BF6A and BF6B. If the master beacon frames have stronger signals and/or quality, for example, the synchronization may be performed with master beacons as illustrated in FIG. 9 above the time line of the receptor time t_TRR.

The tag response receptor TRR, once locked/synchronized with the beacon repeater device used as a reference beacon device, will similarly allow a time differences of arrival analysis illustrated below the line of time t_TRR'; this time using time periods X2' and X18' indicated with respect to the repeater frame BF6B for the accumulated time-of-flight. It should be noted that the accumulated time-of-flight is only schematically illustrated in FIG. 12 as it cannot easily not be illustrated correctly at the line of time t_TRR' of the tag response receptor unit TRR as one would need to include the time shift between the time t_TRR' of the tag response receptor unit and the beacon repeater device, as the beginning of the time slot for beacon frame BF6B in FIG. 12 does not coincide with the transmission time of the repeater beacon frame BF6B from the beacon repeater device.

It will be understood that the time periods X2' and X18' (in FIG. 12) are generally different from the time periods X2 and X18 (in FIG. 9) because the accumulated time-of-flight begins at the transmission time at the repeater beacon frame associated with the repeater frames BF6A and BF6B. In other words, in comparison with FIG. 9, a different reference beacon device was used that for most positions will be at a different distance from the tag device than the master beacon device used (selected) in FIG. 9 (or any other beacon repeater device). That reference beacon devise is further similarly at different distances from the tag response receptor units than the master beacon device used (selected) in FIG. 9 (or any other beacon repeater device). Thus, besides position information of the tag response receptor TRR also position information of the beacon repeater device BR may be included in the localizing calculations, e. g., to compute the distance from the tag device to the beacon repeater device. Accordingly, information on the selected beacon repeater device (here the beacon repeater device associated with the repeater frames BF6A and BF6B) may be included in the tag response frame, emitted from the tag device.

Similarly, the tag devices can use the repeater frames BF6A and BF6B of FIG. 11 for calibration. Usually, the tag device may use the same beacon frames for calibration and emitting the tag response frames, assuming that in both cases preferably the beacon frame signals with the best signal quality and or strength are used. Thus, in FIG. 11 the tag response frames may be based on the repeater frames BF6A and BF6B (or a time point associated with the same) under a respective consideration of the repeater time delay RTD_BR when setting the time of transmission of the tag response frame, i.e., determining the tag-specific emission time delay from the tag-specific emission time delay data.

Figure 13:
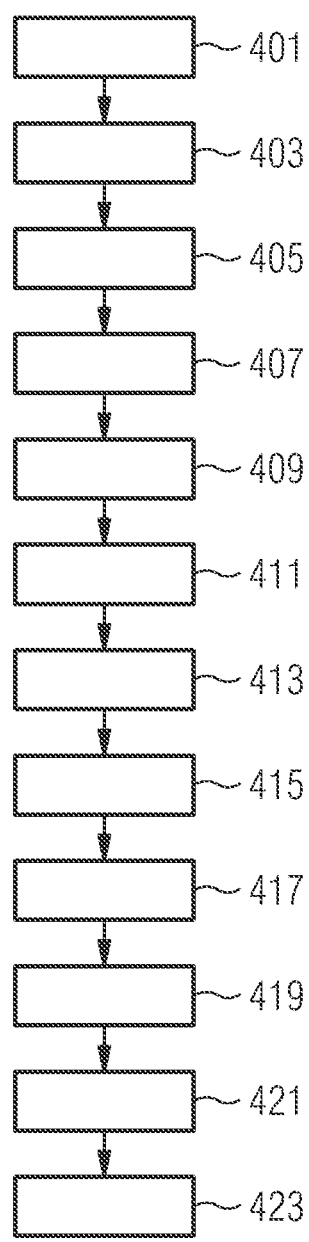
FIG. 13 shows a flowchart illustrating a first method for determining positions of tag devices.

Referring to the flowchart shown in FIG. 13 (and further in reference to FIGS. 7 to 12), a method for providing distance values between a tag device and a plurality of tag response receptor units of a RTLS includes the steps:

transmitting (step 401) a first beacon frame BF1A at a first beacon transmission time point ToT1 and a second beacon frame BF1B at a second beacon transmission time point ToT2 with a beacon transmission unit of a master beacon device MB. The time difference between the beacon frames is set because the two successive beacon frames are transmitted with a master time delay MTD corresponding to a master time delay data (timing shown in FIG. 7);

receiving (step 403) the two successive beacon frames at the tag device T1, T2, . . . , determining (step 405) a first tag beacon time point ToA1_T and a second tag beacon time point ToA2_T for the receiving of the two successive beacon frames at the tag device T1, T2, . . . (timing shown in FIG. 8);

generating (step 407) a tag-specific reception time delay data 251 from the first and second tag beacon time points ToA1_T and ToA2_T;

calibrating (step 409) a tag time of the tag device to a master time of the master beacon device by comparing the tag-specific reception time delay data and respective master time delay data;

deriving (step 411) a tag-specific emission time delay TSTD_TF2 from preset tag-specific emission time delay data 247 for the calibrated tag time. The tag-specific emission time delay TSTD_TF2 is associated, for example, with one of the tag beacon time points ToA1-T and ToA2_T as a starting point (being a time point associated with the receiving of the two successive beacon frames);

emitting (step 413) a tag response frame from the tag device after waiting for the tag-specific emission time delay TSTD_TF2 upon the time point associated with the receiving of the two successive beacon frames (timing shown in FIG. 8);

receiving (step 415) the tag response frames sent from the tag device with, for example, the plurality of tag response receptor units TRR such as within the master beacon device MB and/or the beacon repeater devices BR (timing shown in FIG. 9-12);

determining (step 417) a plurality of receptor response time points ToATF2_R for the arrival times of the tag response frame at the respective tag response receptor units, wherein each receptor response time point is specific for the respective tag response receptor unit and the tag device due to the tag-specific emission time delay TSTD_TF2;

determining (step 419) path time periods lapsed between a time point associated with the transmitting of the two successive beacon frames ToT1, ToT2 and the receptor response time points ToATF2_R for the arrival times of the tag response frame at the respective response receptor units;

deriving (step 421) accumulated time-of-flight periods by subtracting the tag-specific emission time delay TSTD_TF2 of the tag device from the determined path time periods, wherein each accumulated time-of-flight period is associated to a transmission path from the master beacon device to a respective one of the response receptor units via the tag device, determining (step 423) the distance values associated to the position of the selected tag device from the determined accumulated time-of-flight periods and installation position data that optionally represent the distances between each of the plurality of tag response receptor units and the beacon transmission unit of the master beacon device.

The receiving of the two successive beacon frames in step 403 at the tag device T1, T2, . . . could also be a receiving of two successive beacon frames of a beacon repeater BR; therefor, step 401 could also include transmitting (step 401) a first beacon frame at a first beacon transmission time point and a second beacon frame at a second beacon transmission time point with a beacon transmission unit of a beacon repeater device BR (timing shown in FIG. 11). The time difference between the beacon frames is set accordingly because the two successive beacon frames are transmitted with a master time delay MTD (corresponding to a master time delay data). As all beacon repeaters are synchronized and calibrated with the master time, they all are able to send the two successive beacon frames with the master time delay corresponding to master time delay data.

As indicated above, the distance values associated to the position of the selected tag device may be derived in various manners. In a first approach, where the master beacon device (or a selected beacon repeater device) also acts as tag response reception unit, a (standard) ToF-computation can be done to determine the (master/repeater) time-of-flight between the master beacon device (or the selected beacon repeater device) and the tag response reception unit. Then, each of the accumulated time-of-flight from the master beacon device (or the selected beacon repeater device) to other tag response reception units can be reduced by that (master/repeater) time-of-flight to derive the time-of-flight between the tag device and the respective tag response reception unit (also referred to as receptor time-of-flight period). If a time-of-flight between the master beacon device (or the selected beacon repeater device) and the tag response reception unit is not available, TDoA-computations can be performed using the transmission times from the master beacon device (or a selected beacon repeater device) and arrival at several tag response reception units as well as the tag-specific delay time periods and the position information (i.e., the installation position data) of the involved devices (here the master beacon device or the selected beacon repeater device and the tag response reception units).

Figure 14:
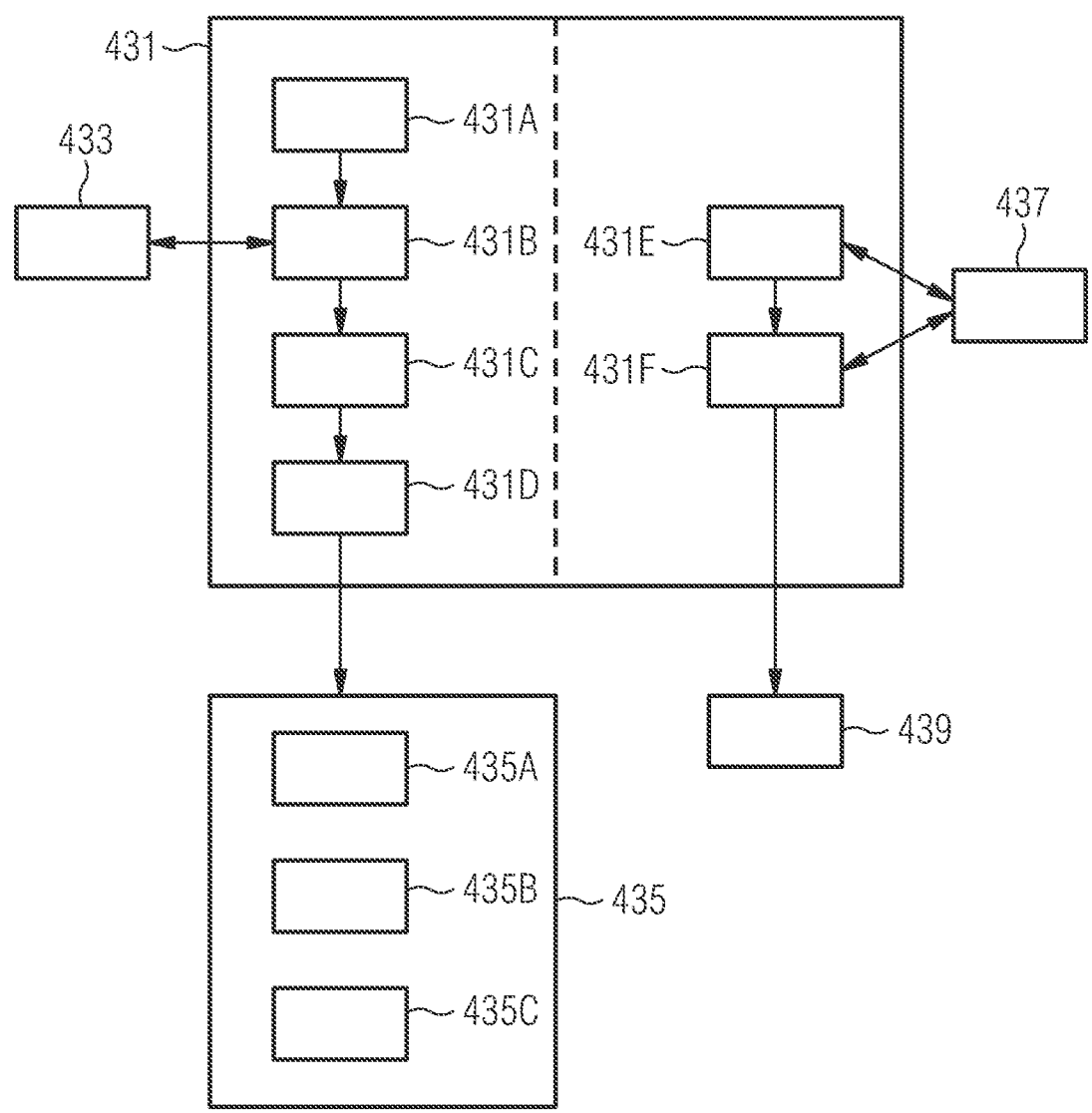
FIG. 14 shows a flowchart illustrating a second method for determining positions of tag devices.

Referring to the flowchart shown in FIG. 14 (and further in reference to FIGS. 2 and 3), a real-time location method for determining positions of one or more tag devices includes the step of:

sending and receiving (step 431) ultra-wideband frames using an exchange protocol based on a ultra-wideband frame format in, wherein the exchange protocol defines a location rate frame format 121 that includes:

a beacon section comprising a series of time slots associated to interleaved pairs of beacon frames, wherein a first beacon frame and a second beacon frame of each pair are separated in time by a master time delay, and wherein, between time slots assigned to the beacon frames of an opening pair comprising an initial one of the beacon frames within the beacon section, there is an array of time slots that are respectively assigned to the first beacon frames of the remaining pairs; and optionally a tag response section comprising a sequence of time slots associated to tag response frames.

In some embodiments, the sending and receiving step 431 may include the steps:

transmitting (step 431A) a pair of beacon frames with a master beacon device or a beacon repeater device at respective time slots of the beacon section, wherein a master clock of the master beacon device or a calibrated beacon repeater of a beacon repeater device is used to transmit the pair of beacon frames based on a calibrated master time or repeater time with a master time delay;

receiving (step 431B) the pair of beacon frames sent at time slots of the beacon section with a tag device to be located and a plurality of tag response receptor units.

The real-time location method may further include the step:

calibrating (step 433) a tag clock of the tag device and receptor clocks of the plurality of tag response receptor units with respect to a master clock using the master time delay.

The sending and receiving step 431 may further include the steps:

transmitting (step 431C) a tag response frame at a time slot of the tag response section associated to the tag device to be located;

receiving (step 431D) the tag response frame with the plurality of tag response receptor units.

The real-time location method may further include the step, based on relative position information of the master beacon device or the beacon repeater device with respect to the plurality of beacon repeater devices:

determining (step 435) distance information from the tag device to be located to the master beacon device or the beacon repeater device and the plurality of tag response receptor units.

In some embodiments, the determining step 435 may be performed in centralized control unit of the location system and include, for example, for continuously performed location rate frames and for each of the tag devices:

determining (step 435A) path time periods for each of the tag devices, wherein each path time period is associated to any one of the two successive beacon frames, the respective tag response frame (and accordingly the tag respective specific time delay), and a transmission path from the master beacon device or beacon repeater device to one of the plurality of tag response receptor units, deriving (step 435B) accumulated time-of-flight periods from the path time periods indicating a cumulated signal propagation time for one of the two successive beacon frames and the tag response frames along the transmission paths, and determining (step 435C) distance values associated to the tag device positions from the accumulated time-of-flight periods and a plurality of installation position data representing optionally the distances between each of the plurality of tag response receptor units and the beacon transmission unit of the master beacon device or beacon repeater device.

In some embodiments, the sending and receiving step 431 may include the steps:

transmitting (step 431E) a plurality of interleaved pairs of beacon frames with a master beacon device and a plurality of beacon repeater devices at respective time slots of the beacon section; and receiving (step 431F) beacon frames sent at time slots of the beacon section with a tag device.

The real-time location method may further include the steps:

calibrating (step 437) a tag clock of the tag device and repeater clocks of the plurality of beacon repeater devices with respect to the master clock using the master time delay, thereby setting up an ultra-wideband anchors network synchronized in timing based on the master beacon device and the plurality of beacon repeater devices; and based on relative position information of the master beacon device and the plurality of beacon repeater devices, determining (step 439) distance information from the tag device to the master beacon device and the plurality of beacon repeater devices.

For example, difference of the time of arrival times ToA1 for the reception of the beacon frames (master and repeater frames) can be analyzed to derive the positions with respect to the master beacon device and beacon repeater device (assuming that the relative positions of the master beacon device and the beacon repeater device are known, e.g., stored in the tag device as relative position information).

Figure 15:
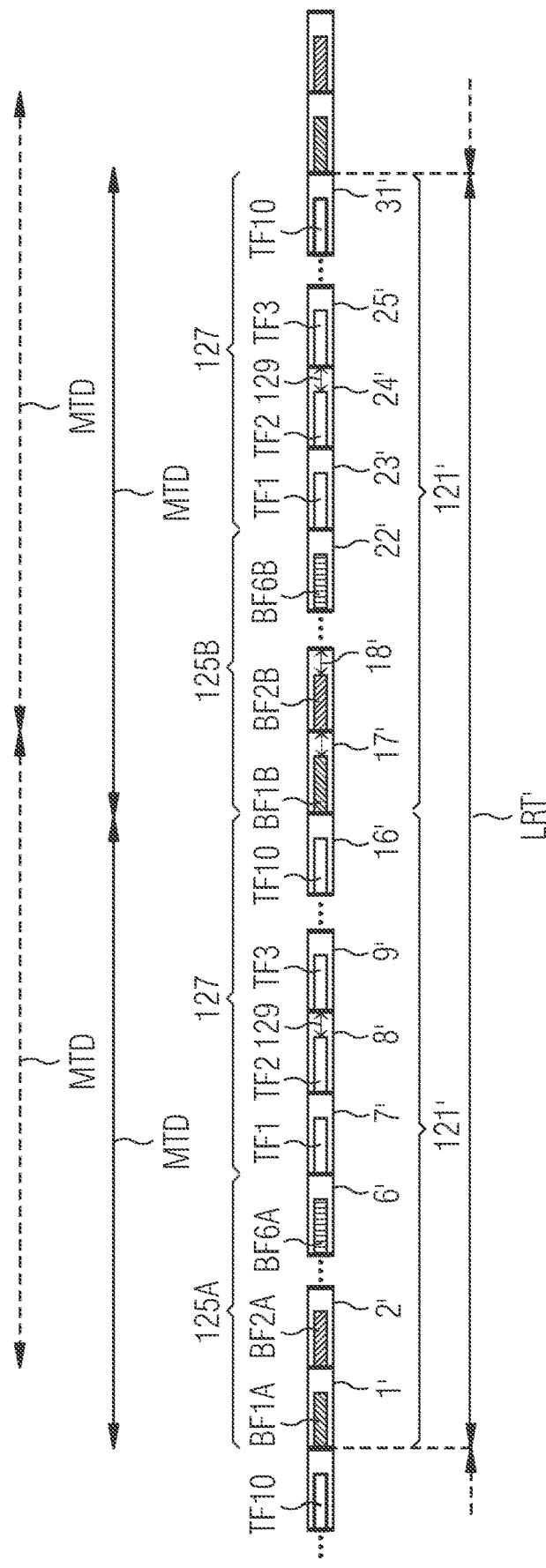
FIG. 15 shows a schematic illustration of a further exemplary location rate frame as a basis for a localizing protocol.

Referring to FIG. 15, another embodiment of a location protocol is illustrated based on a functional location rate frame with a functional location rate period LRT'. The functional location rate frame is composed of two location frames that are identical with respect to the underlying location rate frame formats 121' that each define the master beacon and repeater beacons transmission slots 1 to 6 (in FIG. 15 referred to as beacon sections 125A and 125B), and the tag devices tag slots 7 to 16 (in FIG. 15 referred to as tag response section 127).

Although not specifically shown in FIG. 15, there may be slots between the beacon section and the tag section such as in FIG. 3, slots 13 and 32. Similarly, there can be guard time periods as pointed out in connection with FIG. 3 between slots.

In contrast to the configuration shown in FIG. 3, two neighboring location frames provide for the twin beacons; i.e., the master time delay MTD for the functionality of the clock calibration is given by respectively identical beacon slots of successive location frames. As shown in FIG. 15 for the master beacon slot 1', the master time delay MTD spans over all remaining slots (i.e., slots 2' to 16' for UWB frames BF2A . . . BF6A of the repeater beacons as well as TF1 . . . TF10 for the tag slots). Similarly, the master time delay MTD spans over the slots of the successive repeater beacons BF2A/BF2B or BF6A/BF6B and the master beacon and remaining repeater beacon slots as well as the tag slots in-between.

In other words, the functional location rate frame can be the basis for a location system whereby the functional location rate period LRT' defines temporally the respective activities performed for calibration, while the location measurement can take place at half the functional location rate period LRT'. In that sense, the location protocol defines essentially a maximum location rate at which localizing measurements can be repeated and that maximum location rate is twice the synchronization rate, which is given by the functional location rate period LRT'.

As a common aspect of the location frames of FIG. 3 and FIG. 15, the clock calibration described above for location frame 121 can be similarly performed with the two location rate frames 121' shown in FIG. 15. That means that a master beacon device MB transmits a sequence of beacon frames that are received by the tag devices T1, . . . and the tag response receptor units 227, and optionally the beacon repeater devices BR1, BR2, . . . BR6. The underlying master time delay MTD is then used to enforce also the master time delay MTD as time differences between, for example, tag response frames sent from the tag device and beacon frames sent from each of the beacon repeater devices BR1, BR2, . . . BR6. In addition, the receptor clocks of the tag response receptors TRR can be calibrated based on the master time delay MTD.

In other words, when performing a localizing process with the functional location rate period LRT' and the location rate frame format 121', a tag data storage unit is configured to store the master time delay data, and at least one time point associated with the receiving of the two successive beacon frames, a tag-specific emission time delay data specifically associated to the respective tag device and the at least one time point associated with the receiving of the two successive beacon frames (e.g., in FIG. 15: BF1A). A tag response frame will be sent after waiting for the tag-specific emission time delay upon the at least one time point associated with the receiving of the two successive beacon frames (e.g., in FIG. 15: BF1A).

Referring to FIGS. 16 and 17A to 17C, an alternative or additional localizing approach is disclosed that can be operated based on the herein disclosed location rate frames such as in FIG. 3 or FIG. 15. In contrast to the solution described above, which can be implemented as server centric solutions, the device centric solution does not require tag response frames to be emitted. Moreover, instead of a plurality of tag response receptors, a plurality of beacon repeater devices BR1, BR2, . . . BR6 is required. It is noted that the concept of the herein disclosed location rate frame allows simultaneous operation of a server centric solution and a device centric solution. For illustration, FIG. 16 also shows a tag device T1, a tag response receptor TRR, and a (serve based) distance determination unit 261 in dashed/dashed dotted lines. Further tag devices T2, T3 . . . working as described in FIG. 3 could also be used.

Figure 16:
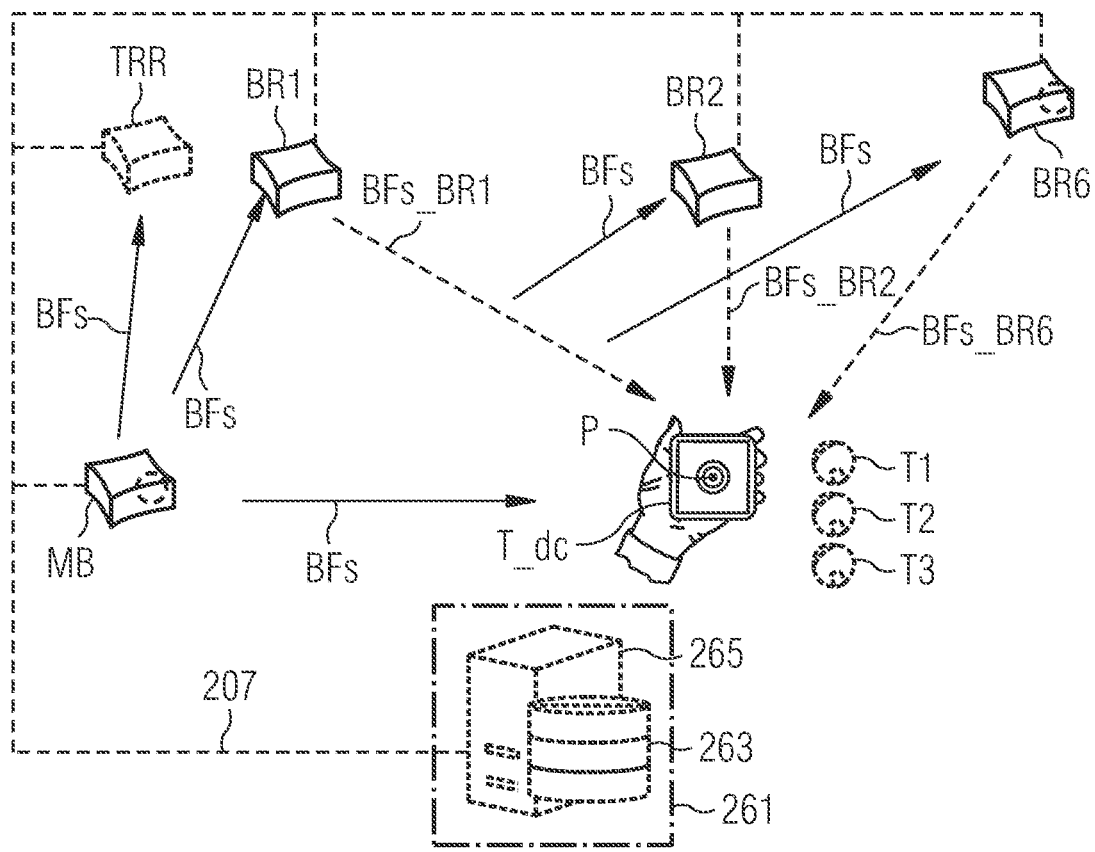
FIG. 16 shows a schematic illustration of a location system for tag device centered localizing.

FIG. 16 illustrates an installation of a device centric localization of tag T_dc with beacon frames send from the master beacon device MB and the beacon repeater devices BR1, BR2, . . . BR6. As a result of the device centric localization procedure, a position P of the tag T_dc is available at the tag T_dc itself. It will be understood that respective tag devices can be incorporated in various types of mobile devices such as autonomously driving/moving vehicles, drones, and robots.

Figure 17A:
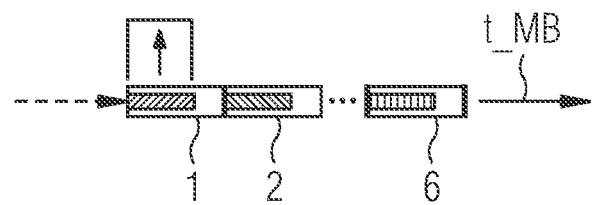
FIGS. 17A to 17C show schematically various actions performed during a tag device centered localizing protocol.
Figure 17B:
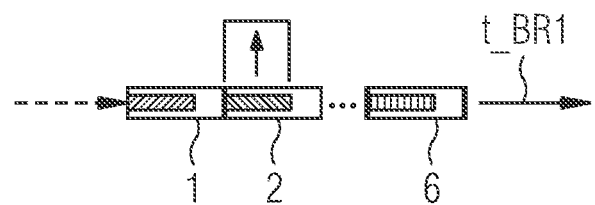

As a common aspect with the localizing solution described in connection with FIG. 3, the clock calibration for location frames can be similarly performed. That means that a master beacon device MB transmits a sequence of beacon frames BFs as illustrated in FIG. 17A that are received by the beacon repeater devices BR1, BR2, . . . BR6 and used to enforce also the master time delay as time differences between the beacon frames BFs sent from each of the beacon repeater devices BR1, BR2, . . . BR6. The transmission of a repeater beacon frame is illustrated in FIG. 17A. In addition, the tag device T_dc, . . . or several of them can also be calibrated based on the master time delay MTD between successive beacon frames BFs (sent either from the master beacon device MB or the beacon repeater devices BR1, BR2, . . . BR6).

Figure 17C:
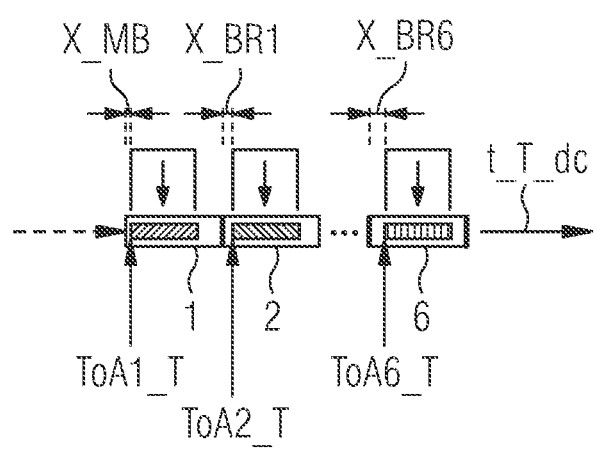

While the mobile tag devices device in FIG. 4 requires reception of beacon frames from at least one reference beacon device, the tag device T_dc in FIG. 16 receives beacon frames from a sufficient number of transmitting master/beacon repeater devices. E. g., five TDoA-measurements may be sufficient for calculating the position on board the tag device T_dc within the calibration and calculation unit 229 shown in FIG. 6. The calibration and calculation unit 229 is configured to measure for the received beacon frames respective temporal shifts with respect to the associated time slots based on the calibrated tag time of the calibrated tag clock. In FIG. 17C, exemplarily shifts X_MB, X_BR1, ... X_BR6 are illustrated within the slots 1 to 6 of FIG. 3 (and similarly slots 1' to 6' of FIG. 15) associated to the beacon frames received. As further indicated in FIG. 17C, for respective time of arrivals ToA1_T, ToA2_T, ... ToA6_T (measured at the tag device T_dc), the time-difference-of-arrival analysis can be performed in the calibration and calculation unit 229. The time-difference-of-arrival analysis uses further the knowledge of the exact position of the transmitting master beacon repeater devices (installation position information) that accordingly is stored in the tag data storage unit 245 of the tag device T_dc. If the tag device T_dc, specifically the calibration and calculation unit 229, provides sufficient computing power on board, the position can be calculated essentially online with the location rate period (LRT in FIG. 3 and ½*LRT' in FIG. 15).

Alternatively or additionally, the tag device T_dc can use a fast data exchange with a network-based processor to perform the calculations also in a server centric-like solution. For example, the tag T_dc may communicate with the distance determination unit 261 that—although with some delay—may also be able to derive the information on the position P.

The location (position of tag device T_dc) is computed by applying TDoA position computation. The TDoA-analysis is based on the knowledge of the exact positions of locally fixed transmitter devices (master/repeater beacons, or tag devices that are temporarily fixed in their location) and the measured time-difference-of-arrival of each received beacon frame with respect to the associated time slot. This localizing approach allows fast location determination with a fast refresh rate and a low latency. It is in particular suited for localizing fast moving objects.

As mentioned above, temporarily stationary tag devices can be used for the device centric localization of the tag device T_dc. For example, the tag device T1 illustrated in FIG. 16 can be operated simultaneously with the tag device T_dc using the same infrastructure to perform server based localization procedures. If the position of the tag device T1 is known (and stationary) and transmitted to the tag device T_dc, the tag device T1 can be used as a temporarily stationary transmitter device for those time periods where it is (at least temporarily) not changing its position in space. Specifically, assuming that within the tag slot included in the location rate frame for the tag device T1, a tag frame can be emitted that is received by the tag device T_dc and evaluated (like the beacon frames) within the TDoA-analysis.

It is further noted that a location rate frame could only be based on the beacon time slots if there is no tag devices emitting tag response frames that needs to be localized.

The skilled person will acknowledge further that the tag devices of a server centric solution may have a less complex design as they are "only" receiving and transmitting, while the tag devices of the device centric solution may require further features, e.g. processing units (for the calculations), storage space (for the positions of the transmitters), etc. and thus also a larger power source.

Further aspects of the herein disclosed concepts include:

In the real-time location system (201), at least one of the tag devices (T1, T2, ... ) includes a tag response receptor unit (227) and optionally at least a portion of the distance determination unit (231). The tag devices (T1, T2, ... ) is configured to be operable as a tag device to be localized when being set in a changing position mode, and a tag response receptor unit when being set in in a stationary position mode.

For the real-time location system (201), the transmission of the two successive beacon frames may be repeated at a location rate in the range from 1 ms to 250 ms, if the location system is operated in a movement tracking mode, for example for tracking fast moving tag devices. When localizing processes are required at a very low frequency rate, typically one position determination per hour, one can deregister and reregister the tag deice within the location system. Usually, the location frame rate is not extended well beyond 250 ms.

The location system may be based on a location frame being repeated with a location rate. The location frame is based on a location rate frame format that is used by the components of the location system and may usually have a duration in the range from about 1 ms to 250 ms. The location rate frame format includes a defined number of slots, each slot being associated to a frame emission from a component of the location system and having a slot duration. With this terminology, the tag-specific emission time delay (measured from a last beacon frame emitted within a location frame), which is the shortest of the plurality of tag-specific emission time delays, may be in the range of a slot duration (e.g. the location rate divided by the number of slots). Moreover, the tag-specific emission time delay being the longest of the plurality of tag-specific emission time delays may be at the most the location rate reduced by two slot durations (generally reduced by the slot durations of all slots associated with beacon frame transmissions).

In some embodiments, the tag device and optionally the tag response receptor unit may provide timing information associated to the received frames such as time points or time intervals between time points to the calibration and calculation unit. In particular, thereby integration may be performed with an integration window of 2 ns with steps of 1 ns, locally 125 ps.

A calibration and calculation unit within one of the components may then be configured to receive the timing information from the receptor unit and perform the calibration, in particular the comparison of time delays based on the timing information associated to the received frames such as the time points or the time intervals between time points.

In the following, further aspects of the herein disclosed inventive concepts are summarized:

Aspect 1. A real-time location method for determining positions of one or more tag devices, comprising:
  sending and receiving ultra-wideband frames using an exchange protocol based on a ultra-wideband frame format, wherein the exchange protocol defines a location rate frame format that includes:
    a beacon section comprising a series of time slots associated to at least one frame of interleaved pairs of beacon frames,
  wherein a first beacon frame and a second beacon frame of each pair are separated in time by a master time delay, and
  wherein, between time slots assigned to the beacon frames of an opening pair comprising an initial one of the beacon frames within the beacon section, there is an array of time slots that are respectively assigned to the first beacon frames of the remaining pairs; and
    a tag response section comprising a sequence of time slots associated to tag response frames.

Aspect 1A. The real-time location method of Aspect 1, wherein the beacon section 125 includes a time slot (1, 2, 3, ... 6, 7, 8, ... 12) for both of the frames of the interleaved pairs of beacon frames such that the beacon section has a length of at least the master time delay (and the beacon section has a length that is less than the length of the location rate frame reduced by a length of the tag response section, thereby two successive beacon frames of the same source are received during the beacon section for enabling calibration).

Aspect 1B. The real-time location method of Aspect 1, wherein the beacon section includes a time slot (1', 2', 3', ... 6') for only one of the frames of each interleaved pair of beacon frames such that the beacon section and the tag response section together have a length of at least the master time delay, and wherein in particular for successive location rate frames subject to the location rate frame format, there are the time slots (7'-16') of the tag response section and the time slot (2'-6') for only one of the frames of each interleaved pair of beacon frames between the time slots (1', 17') assigned to two initial beacon frames of the beacon sections of the successive location rate frames.

Aspect 2. The real-time location method of Aspect 1, 1A, 1B, wherein, between time slots assigned to the beacon frames of a closing pair comprising a least one of the beacon frames within the beacon section, there is an array of time slots that are respectively assigned to the second beacon frames of the remaining pairs.

Aspect 3. The real-time location method of Aspect 1, 1A, 1B or Aspect 2, further comprising:

transmitting a plurality of interleaved pairs of beacon frames with a master beacon device and a plurality of beacon repeater devices at respective time slots of the beacon section;

calibrating repeater clocks of the plurality of beacon repeater devices with respect to the master clock using the master time delay, thereby in particular setting up an ultra-wideband network synchronized in timing based on the master beacon device and the plurality of beacon repeater devices;

receiving beacon frames sent at time slots of the beacon section with a tag device;

based on relative position information of the master beacon device and the plurality of beacon repeater devices, determining distance information from the tag device to the master beacon device and the plurality of beacon repeater devices.

Aspect 3A. The real-time location method of Aspect 1 or Aspect 2, further comprising:

transmitting a plurality of successive beacon frames with a master beacon device (MB) and a plurality of beacon repeater devices (BR) at respective time slots of the beacon section (125), whereby, for the beacon frames sent with the master beacon device, there is set a master time delay (MTD) between two neighboring of the beacon frames (BF1A, BF1B) sent with the master beacon device;

calibrating repeater clocks of the plurality of beacon repeater devices (BR) with respect to the master clock using the master time delay data (223), such that also for the beacon repeater devices (BR), there is set the master time delay (MTD) between two neighboring of the beacon frames sent with one of the beacon repeater devices (BR) in order to set up an ultra-wideband network synchronized in timing based on the master time (t_MB) and the plurality of beacon repeater devices;

receiving beacon frames sent at time slots of the beacon section with a tag device; and based on relative position information of the master beacon device and the plurality of beacon repeater devices, determining distance information from the tag device to the master beacon device and the plurality of beacon repeater devices, wherein optionally there is performed a time-difference-of-arrival analysis of tag beacon time points (ToA1_T, ToA2_T, ... ) at the tag device with respect to respective beacon slots.

Aspect 4. The real-time location method of Aspect 1 or Aspect 2, further comprising:

transmitting a pair of beacon frames with a master beacon device or a beacon repeater device at respective time slots of the beacon section, wherein a master clock is provided in the master beacon device for setting a master time delay between the beacon frames of the pair of beacon frames;

receiving the pair of beacon frames sent at time slots of the beacon section with a tag device to be located and a plurality of tag response receptor units;

calibrating a tag clock of the tag device and receptor clocks of the plurality of tag response receptor units with respect to a master clock using the master time delay;

transmitting a tag response frame at a time slot of the tag response section associated to the tag device to be located;

receiving the tag response frame with the plurality of tag response receptor units; and based on relative position information of the master beacon device or the beacon repeater device with respect to the plurality of beacon repeater devices, determining distance information from the tag device to be located to the master beacon device or the beacon repeater device and the plurality of tag response receptor units.

For example, the step of transmitting a pair of beacon frames includes transmitting a pair of beacon frames at respective time slots of the beacon section (125) separated by a master time delay (MTD)

with a master beacon device (MB), wherein a master clock of the master beacon device (MB) is used to ensure the master time delay (MTD) when transmitting the pair of beacon frames based on a calibrated master time, and/or with a beacon repeater device (BR), wherein a repeater clock of the repeater beacon device (MB) is calibrated to the master clock to ensure the master time delay (MTD) when transmitting the pair of beacon frames based on a calibrated repeater time.

Aspect 5. The real-time location method of Aspect 4, wherein, for a tag response receptor unit located at the master beacon device, a master time-of-flight (ToF1) is determined by a master time-of-flight measurement (M_ToF1) and/or, for a tag response receptor unit located at the beacon repeater device, a repeater time-of-flight is determined by a repeater time-of-flight measurement; and, for tag response receptor units located at known distances from the master beacon device or the beacon repeater device, respective time-of-flight sections (ToF2) from the tag device to the tag response receptor units are derived using the master time-of-flight (ToF1) or the repeater time-of-flight measurement.

Aspect 6. The real-time location method of any one of Aspect 1 to Aspect 5, wherein in the location rate frame, there is at least one of a free slot between the beacon section and the tag response section, and a random access slot following the tag response section.

Aspect 7. The real-time location method of any one of Aspect 1 to Aspect 6, wherein the time slots in the beacon section and/or the tag response section comprise a buffer time window between frames of successive slots that is not used for transmission of ultra-wideband signals, and/or a temporal slot length of each of the time slots in the beacon section and/or the tag response section is longer than a temporal frame length of the ultra-wideband frame.

Aspect 8. A real-time location system for determining positions of tag devices, the real-time location system comprising:

a) an exchange protocol for sending and receiving ultra-wideband frames based on a ultra-wideband frame format, wherein the exchange protocol defines a location rate frame that includes:

i) a beacon section comprising a sequence of time slots associated to interleaved pairs of beacon frames, wherein a first beacon frame and a second beacon frame of each pair are separated in time by a master time delay and wherein, between time slots assigned to the beacon frames of an opening pair comprising an initial one of the beacon frames within the beacon section, there is an array of time slots that are respectively assigned to the first beacon frames of the remaining pairs; and ii) a tag response section comprising a sequence of time slots associated to tag response frames;

b) a master beacon device (MB) and optionally beacon repeater devices (BR), respectively including:

i) a beacon transmission unit (217) configured to transmit two successive beacon frames (BFs) at time slots of the beacon section that are associated to one of the interleaved pairs, and ii) a master clock (219) defining a master time (t_MB) to ensure the separation of the two beacon frames to be the master time delay or a repeater clock (219) calibrated to the master clock (219);

c) a plurality of tag devices (T1, T2, . . . ), each tag device (T1, T2, . . . ) including:

i) a tag clock (243) defining a tag time (t_T2) that is specific for the respective tag device (T1, T2, . . . ) wherein the tag time is calibrated with respect to the master time using the master time delay, ii) a reception unit (249) configured to receive the two successive beacon frames (BFs) sent from the master beacon device (MB) or one of the beacon repeater device (BR) at time slots of the beacon section, and iii) a tag response emission unit configured to transmit a tag response frame at a time slot of the tag response section;

d) a plurality of tag response receptor units (227), each including:

i) a receptor clock defining a respective receptor time (t_TRR) for the respective tag response receptor unit wherein the receptor time is calibrated with respect to the master time using the master time delay, and ii) wherein each tag response receptor unit is configured to receive the tag response frame sent from the tag device at the respective time slot of the tag response section; and e) at least one distance determination unit (261, 231) including:

i) a calculation unit configured to, for continuously performed location rate frames and for each of the tag devices:

determine path time periods for each of the tag devices, wherein each path time period is associated to any one of the two successive beacon frames, the respective tag response frame, and a transmission path from the master beacon device (MB) or beacon repeater device (BR) to one of the plurality of tag response receptor units (227) (via the tag device), derive accumulated time-of-flight periods from the path time periods indicating a cumulated signal propagation time for one of the two successive beacon frames and the tag response frames along the transmission paths, and determine distance values associated to the tag device positions from the accumulated time-of-flight periods and a plurality of installation position data representing the position of each of the plurality of tag response receptor units (227) and the beacon transmission unit (217) of the master beacon device (MB) and optionally of the beacon repeater devices (BR).

Aspect 9. The real-time location system of Aspect 8, wherein the ultra-wideband frame format includes a start frame entry and at least one of the reception units of the tag device and the tag response receptor unit is configured to detect the start frame entry included in an ultra-wideband signal and associate a time point to the respective ultra-wideband frame; and/or wherein the ultra-wideband frame format includes a payload entry on a reference beacon frame, a reference beacon slot and/or a reference beacon source, at least one of the plurality of tag devices (T1, T2, . . . ) is configured to select one of the beacon frames received from the master beacon device (MB) and beacon repeater devices (BR) as a reference beacon frame, transmit a tag response frame with temporal reference to that reference beacon frame, and include information on the reference beacon frame, the respective reference beacon slot, and/or the respective reference beacon source in the tag response frame, and at least one of the reception units of the tag response receptor unit is configured to read the payload entry on a reference beacon frame, a reference beacon slot and/or a reference beacon source from the tag response frame, and communicate the same to the at least one distance determination unit (261, 231).

Aspect 10. The real-time location system of Aspect 8 or Aspect 9, wherein for a calibration of a clock to the master time, the tag device, the receptor device or the beacon repeater devices includes:

a calibration and calculation unit configured to detect the time delay between the time points associated to the first of the two successive beacon frames and the time point associated to the second of the two successive beacon frames and to adapt the clock time such that the detected time delay corresponds to the master time delay.

In another aspect 11, a tag device (T1, T2, . . . ) for a real-time location system configured to be operated with a location protocol, the location protocol optionally applying a location rate frame format as recited in one of the claims and/or aspects disclosed herein, the tag device including:

a tag clock (243) defining a tag time (t_T2) that is specific for the respective tag device (T1, T2, . . . );

a tag data storage unit (245) configured to store therein a master time delay data (223) of the real-time location system and a tag-specific emission time delay data (247) specifically associated to a preset time point associated with the receiving of beacon frames (BFs), such as a reception time point of the first or second beacon frame (BFs);

a reception unit (249) configured to receive beacon frames (BFs) that were sent from a master beacon device (MB) and optionally from one or more beacon repeater devices (BR) of the real-time location system in accordance with preset master time delay data (223), select a pair of beacon frames (BFs) of the master beacon device (MB) or optionally of one of the beacon repeater devices (BR);

determine tag-specific reception time delay data (251) between the beacon frames of the selected pair of beacon frames (BFs), and select a beacon frame of the master beacon device (MB) or optionally of one of the beacon repeater devices (BR) as reference beacon frame;

a calibration and calculation unit (229) configured to calibrate the tag clock (243) with respect to the master time (t_MB) by comparing the tag-specific reception time delay data (251) and the master time delay data (223), and a tag response emission unit (253) configured to derive a tag-specific emission time delay (TSTD_TF2) from the tag-specific emission time delay data (247) for a time point associated with the reference beacon frame;

emit a tag response frame (TF1, TF2, . . . ) after the tag-specific emission time delay (TSTD_TF2) has passed from the time point associated with the reference beacon frame for the calibrated tag time (t_T2).

In some embodiments, the tag response emission unit (253) can be further configured to include in the tag response frame (TF1, TF2, . . . ) information of the reference beacon frame that was used to derive the tag-specific emission time delay (TSTD_TF2).

In some embodiments, the tag device of this description having a response emission unit 253 may be configured to decide to use as (reference) time point associated with the receiving of a (reference) beacon frame BF of one of the master beacon device MB or beacon repeater devices BR, for example. Moreover, the tag response emission unit 253 may further be configured to calculate the tag-specific emission time delay TSTD_TF2 also in respect to the information which beacon device was used for the (reference) time point associated with the receiving of the (reference) beacon frame BF. Finally, the tag response emission unit 253 may further be configured to send, in particular in its tag response frame, the information which beacon device was used for the (reference) time point associated with the receiving of the (reference) beacon frame BF.

In another aspect 12, a tag device (T_dc) for a real-time location system configured to be operated with a location protocol, the location protocol optionally applying a location rate frame format as recited in one of the claims and/or aspects disclosed herein, the tag device including:

a tag clock (243) defining a tag time (t_T2) that is specific for the respective tag device (T1, T2, . . . );

a tag data storage unit (245) configured to store therein a master time delay data (223) of the real-time location system and position data sets for positions of a master beacon device (MB) and a plurality of beacon repeater devices (BR) of the real-time location system;

a reception unit (249) configured to receive beacon frames (BFs) that were sent in accordance with the location protocol from at least a subgroup of the master beacon device (MB) and the beacon repeater devices (BR), select a pair of beacon frames (BFs) of the master beacon device (MB) or optionally of one of the beacon repeater devices (BR), determine tag-specific reception time delay data (251) between the beacon frames of the selected pair of beacon frames (BFs), and determine time of arrivals (ToA1_T, ToA2_T, . . . ToA6_T) for beacon frames sent from the subgroup of the master beacon device (MB) and the beacon repeater devices (BR); and a calibration and calculation unit (229) configured to calibrate the tag clock (243) with respect to the master time (t_MB) by comparing the tag-specific reception time delay data (251) and the master time delay data (223), and perform a time-difference-of-arrival analysis using the determined time of arrivals (ToA1_T, ToA2_T, . . . ToA6_T) and the position data sets associated with the respective subgroup of the master beacon device (MB) and the beacon repeater devices (BR).

In some embodiments, the calibration and calculation unit (229) can be further configured to measure, in particular for the received beacon frames (BFs) of the subgroup of the master beacon device (MB) and the beacon repeater devices (BR), respective temporal shifts (X_MB, X_BR1, . . . X_BR6) with respect to the time slot associated the respective master beacon device (MB) or beacon repeater device (BR) (e.g., a time difference relative to the beginning of the respective time slot) based on the calibrated tag time of the calibrated tag clock.

In some embodiments, tag device (T_dc) can be further configured to include in the time-difference-of-arrival analysis a time of arrival for a tag response frame received with the reception unit (249) and sent by another tag device (T1, T2, . . . ), for which the tag device (T_dc) received and stored in the tag data storage unit (245) a position data set indicating a temporarily stationary position for that another tag device.

It will be further understood that the herein disclosed location systems (in particular those location systems recited in the claims and/or aspects) may include and operate any one of the herein disclosed types of tag devices (in particular those tag devices recited in the claims and/or aspects) using device-centric and/or server-centric location procedures.

While the location frames of FIGS. 3 and 15 include tag sections, the above Aspect 12 can also be used without a tag section included in the location rate frame format. In that case, it would correspond to a self-synchronized indoor location system. However, if a tag section is provided in the location rate frame format, the mobile tag device may calculate its position with respect to the TDoA of those frames received from the master beacon devices and the beacon repeater devices (sent in the beacon section(s)) as well as from at least for some time as stationary identified tag devices (sent in the tag section(s)).

Although the preferred embodiments of this invention have been described herein, improvements and modifications may be incorporated without departing from the scope of the following claims.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A real-time location method comprising:
    sending, by a master beacon device and a plurality of beacon repeater devices, ultra-wideband beacon frames, wherein the ultra-wideband beacon frames are transmitted as interleaved pairs of ultra-wideband beacon frames, wherein each interleaved pair is sent either from the master beacon device or the plurality of beacon repeater devices, wherein each interleaved pair includes a first ultra-wideband beacon frame and a second ultra-wideband beacon frame, and wherein, for each interleaved pair, the first ultra-wideband beacon frame and the second ultra-wideband beacon frame are transmitted with a master time delay; and
    receiving, by a tag device, at least one of the interleaved pairs of ultra-wideband beacon frames,
    wherein sending and receiving is performed using an exchange protocol that defines a location rate frame format comprising:
        a beacon section comprising a series of time slots, wherein the time slots are respectively associated to one of the first ultra-wideband beacon frame and the second ultra-wideband beacon frame of an interleaved pair, such that a separation in time of the time slots associated to each of the interleaved pair is given by the master time delay, wherein, between time slots assigned to the first ultra-wideband beacon frame and the second ultra-wideband beacon frame of a first one of the interleaved pairs, which includes an initial one of the ultra-wideband beacon frames within the beacon section, and wherein an array of time slots is respectively assigned to the first ultra-wideband beacon frames of the remaining pairs; and
        determining a position of the tag device by time measurements based on the ultra-wideband beacon frames received at the tag device.

2. The method of claim 1, wherein the plurality of beacon repeater devices comprises at least five beacon repeater devices.

3. The method of claim 1, where the position of the tag device is determined by the tag device itself.

4. The method of claim 1, further comprising calibrating the tag device based on the master time delay between an interleaved pair of ultra-wideband beacon frames from the master beacon device.

5. The method of claim 1, further comprising calibrating the tag device based on the master time delay between an interleaved pair of ultra-wideband beacon frames from a beacon repeater device of the plurality of beacon repeater devices.

6. The method of claim 1, wherein determining the position of the tag device comprises using positions of the master beacon device and the plurality of beacon repeater devices, the positions being stored in a tag data storage unit of the tag device.

7. The method of claim 1, wherein determining the position of the tag device comprises the tag device communicating with a distance determination unit to derive positions of the master beacon device and a plurality of beacon repeater devices.

8. The method of claim 1, wherein determining the position of the tag device comprises using a temporarily stationary tag device as a temporarily stationary transmitter device.

9. The method of claim 1, wherein a transmission of interleaved pairs of ultra-wideband beacon frames is repeated at a rate in a range of 1 ms to 250 ms.

10. A real-time location system comprising:
    a master beacon device comprising:
        a beacon transmission unit configured to transmit two successive beacon frames including a first beacon frame transmitted at a first beacon transmission time point and a second beacon frame transmitted at a second beacon transmission time point,
        a master clock defining a master time, and
        a master storage unit configured to store a master time delay data,
    wherein the two successive beacon frames are transmitted with a master time delay that corresponds to the master time delay data;
    a plurality of beacon repeater devices, wherein each beacon repeater device of the plurality of beacon repeater devices is configured to transmit respective pairs of beacon frames, each respective pair of beacon frames being transmitted with the master time delay; and
    a first tag device comprising:
        a tag clock defining a tag time that is specific for the first tag device;
        a reception unit configured to receive the two successive beacon frames sent from the master beacon device or the respective pairs of beacon frames sent from the plurality of beacon repeater devices; and
        a calculation unit configured to determine distance values associated with a position of the first tag device using respective temporal shifts of the two successive beacon frames sent from the master beacon device or the respective pairs of beacon frames sent from the plurality of beacon repeater devices.

11. The system of claim 10, wherein the plurality of beacon repeater devices comprises six beacon repeater devices.

12. The system of claim 10, wherein the calculation unit is further configured to measure for received beacon frames respective temporal shifts with respect to associated time slots based on the tag time of the tag clock.

13. The system of claim 10, further comprising a second tag device, the second tag device configured to provide position information as a temporarily stationary transmitter device to the first tag device.

14. The system of claim 10, further comprising a tag response receptor configured to receive a tag response frame from the first tag device and derive a specific time of arrival for the tag response frame from the first tag device.

15. The system of claim 10, further comprising a distance determination unit, the distance determination unit comprising a data storage unit configured to store master time delay data.

16. The system of claim 15, wherein the data storage unit is further configured to store installation position data for the master beacon device and the plurality of beacon repeater devices.

17. The system of claim 10, wherein the calculation unit is further configured to perform a time-difference-of-arrival analysis using installation position data for the master beacon device and the plurality of beacon repeater devices.

18. The system of claim 17, wherein the first tag device further comprises a tag data storage unit, the tag data storage unit being configured to store installation position data for the master beacon device and the plurality of beacon repeater devices.

19. A tag device comprising:
   a tag clock providing a tag time;
   a reception circuit configured to:
      receive two successive beacon frames sent from a master beacon device or a beacon repeater device,
      determine a first tag beacon time point and a second tag beacon time point for the receiving of the two successive beacon frames at the respective tag device, and
      generate a tag-specific reception time delay data from the first tag beacon time point and the second tag beacon time point;
   a tag data storage circuit configured to store master time delay data, a reference time point associated with receiving of one of the beacon frames being used as a reference beacon frame, and a tag-specific emission time delay data associated with the tag device and the reference time point; and
   a calibration and calculation circuit configured to:
      calibrate the tag clock with respect to a master time by comparing the tag-specific reception time delay data and the master time delay data, and
      determine distance values associated with a position of the tag device using respective temporal shifts of the two successive beacon frames.

20. The device of claim 19, further comprising a tag response emission circuit configured to:
   derive a tag-specific emission time delay from the tag-specific emission time delay data for the tag clock and the reference time point, and
   emit a tag response frame after waiting for the tag-specific emission time delay upon the reference time point.

* * * * *